United States Patent
Arshad et al.

(10) Patent No.: US 11,805,455 B2
(45) Date of Patent: Oct. 31, 2023

(54) CELL GLOBAL IDENTIFIER, CGI, REPORTING OF ENHANCED LTE (ELTE) CELLS

(71) Applicant: Telefonaktiebolaget LM Ericsson (publ), Stockholm (SE)

(72) Inventors: Malik Wahaj Arshad, Upplands Väsby (SE); Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 249 days.

(21) Appl. No.: 17/256,680

(22) PCT Filed: Aug. 8, 2019

(86) PCT No.: PCT/SE2019/050730
§ 371 (c)(1),
(2) Date: Dec. 29, 2020

(87) PCT Pub. No.: WO2020/032865
PCT Pub. Date: Feb. 13, 2020

(65) Prior Publication Data
US 2021/0266802 A1    Aug. 26, 2021

Related U.S. Application Data

(60) Provisional application No. 62/716,193, filed on Aug. 8, 2018.

(51) Int. Cl.
*H04W 36/00* (2009.01)
*H04W 48/16* (2009.01)
*H04W 84/04* (2009.01)

(52) U.S. Cl.
CPC . *H04W 36/00835* (2018.08); *H04W 36/0061* (2013.01); *H04W 36/0066* (2013.01); *H04W 48/16* (2013.01); *H04W 84/042* (2013.01)

(58) Field of Classification Search
CPC ....... H04W 36/00835; H04W 36/0066; H04W 36/0061; H04W 48/16; H04W 24/02;
(Continued)

(56) References Cited

U.S. PATENT DOCUMENTS 8,849,282 B2 * 9/2014 Serravalle ......... H04W 36/0016
455/436
9,301,208 B1 * 3/2016 Sitaram ............. H04W 36/0016
(Continued)

FOREIGN PATENT DOCUMENTS

WO    2014206179 A1    12/2014

OTHER PUBLICATIONS

"Discussion on ANR Functionality for el TE", 3GPP TSG-RAN WG2#99bis; R2-1710183; Prague, Czech Republic, Oct. 9-13, 2017, pp. 1-3.
(Continued)

*Primary Examiner* — Allahyar Kasraian
(74) *Attorney, Agent, or Firm* — Murphy, Bilak & Homiller, PLLC

(57) ABSTRACT

Embodiments include methods for a first node, configured to provide a serving cell to a user equipment (UE) in a radio access network, to determine core network types supported by a second node configured to provide neighbor cell(s) of the serving cell. Such embodiments include determining that a first cell identifier associated with a particular one of the neighbor cells is not included in a neighbor relations table maintained by the first node. Such embodiments also include sending, to the UE, a request to report a second cell identifier associated with the particular neighbor cell, the request including the first cell identifier. Such embodiments also include determining one or more core network types supported by the particular neighbor cell based on the content of a report from the UE. Other embodiments include
(Continued)

complementary methods performed by a UE, as well as network nodes and UEs configured to perform such methods.

20 Claims, 16 Drawing Sheets

(58) Field of Classification Search
CPC ............. H04W 36/0055; H04W 36/08; H04W 36/0058; H04W 84/042; H04W 36/0016; H04W 36/0079; H04W 36/32; H04W 36/14
See application file for complete search history.

(56) References Cited

U.S. PATENT DOCUMENTS

| | | | | |
|---|---|---|---|---|
| 2012/0142356 | A1* | 6/2012 | Serravalle | H04W 36/0016 455/436 |
| 2013/0295915 | A1* | 11/2013 | Nakamata | H04W 36/0061 455/422.1 |
| 2016/0262059 | A1* | 9/2016 | Butala | H04W 36/0033 |
| 2019/0174571 | A1* | 6/2019 | Deenoo | H04W 36/30 |
| 2019/0253944 | A1* | 8/2019 | Kim | H04W 36/08 |
| 2019/0261264 | A1* | 8/2019 | Lou | H04W 48/18 |
| 2019/0281514 | A1* | 9/2019 | Krishnan | H04W 24/02 |
| 2019/0288909 | A1* | 9/2019 | Kadiri | H04W 4/70 |
| 2020/0145843 | A1* | 5/2020 | Yang | H04W 36/00835 |
| 2020/0359282 | A1* | 11/2020 | da Silva | H04W 36/0069 |
| 2021/0153083 | A1* | 5/2021 | Moosavi | H04W 36/0061 |
| 2021/0211899 | A1* | 7/2021 | Koziol | H04W 24/10 |

OTHER PUBLICATIONS

"Further Considerations on ANR Functionality for el TE Considering Different TAC Formats", 3GPP TSG-RAN2 Meeting #102; R2-1806702; Busan, Korea; Revision of R2-1804539, May 21-25, 2018, pp. 1-4.
"Report of email discussion [101 bis#47][NR] ANR", 3GPP TSG-RAN WG2 Meeting #102; R2-1807626; Busan, Korea, May 21-25, 2018, pp. 1-21.
"Summary of Offline discussion #08 on coding of PLMNs list", 3GPP TSG-RAN WG2 Meeting #101 bis; R2-1806439; Sanya, China, Apr. 16-20, 2018, pp. 1-29.
3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.2.0, Jun. 2018, pp. 1-357.
3GPP, "3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.4.0, Sep. 2017, pp. 1-753.
3GPP, "3rd Generation Partnership Project; Technical Specification Group Radio Access Network; Evolved Universal Terrestrial Radio Access (E-UTRA); Radio Resource Control (RRC); Protocol specification (Release 15) 3GPP TS 36.331 V15.2.0", TS 36.331 V15.2.0, Jun. 2018, pp. 1-269.
3GPP, "3rd Generation Partnership Project; Technical Specification Group Radio Access Network; Evolved Universal Terrestrial Radio Access (E-UTRA); User Equipment (UE) procedures in idle mode (Release 15) 3GPP TS 36.304 V15.0.0", 3GPP TS 36.304 V15.0.0, Jun. 2018, pp. 1-52.
3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, pp. 1-303.
3GPP, "3rd Generation Partnership Project; Technical Specification Group Radio Access Network; Study on New Radio Access Technology; Radio Interface Protocol Aspects (Release 14)", 3GPP TR 38.804 V14.0.0, Mar. 2017, pp. 1-57.

* cited by examiner

```
SystemInformationBlockType1 ::= SEQUENCE {
    cellAccessRelatedInfo       SEQUENCE {
        plmn-IdentityList           PLMN-IdentityList,
        trackingAreaCode            TrackingAreaCode,
        cellIdentity                CellIdentity,
        cellBarred                  ENUMERATED {barred, notBarred},
        intraFreqReselection        ENUMERATED {allowed, notAllowed},
        csg-Indication              BOOLEAN,
        csg-Identity                CSG-Identity       OPTIONAL   -- Need OR
    }
```

*Fig. 5A*

```
SystemInformationBlockType1-v1430-IEs ::=  SEQUENCE {
    eCallOverIMS-Support-r14        ENUMERATED {true}         OPTIONAL,  -- Need OR
    tdd-Config-v1430                TDD-Config-v1430     OPTIONAL,  -- Cond TDD-OR
    cellAccessRelatedInfoList-r14   SEQUENCE (SIZE (1..maxPLMN-1-r14)) OF
                                    CellAccessRelatedInfo-r14   OPTIONAL,  -- Need OR
    nonCriticalExtension            SystemInformationBlockType1-v1450-IEs   OPTIONAL
}
CellAccessRelatedInfo-r14 ::=   SEQUENCE {
    plmn-IdentityList-r14           PLMN-IdentityList,
    trackingAreaCode-r14            TrackingAreaCode,
    cellIdentity-r14                CellIdentity
}
```

*Fig. 5B*

```
MeasResultEUTRA ::=    SEQUENCE {
    physCellId              PhysCellId,
    cgi-Info                SEQUENCE {
        cellGlobalId            CellGlobalIdEUTRA,
        trackingAreaCode        TrackingAreaCode,
        plmn-IdentityList       PLMN-IdentityList2              OPTIONAL
    ...
}

PLMN-IdentityList2 ::=      SEQUENCE (SIZE (1..5)) OF PLMN-Identity

CellGlobalIdEUTRA ::=       SEQUENCE {
    plmn-Identity               PLMN-Identity,
    cellIdentity                CellIdentity
}
```

*Fig. 5C*

```
SystemInformationBlockType1-v15xy-IEs ::=   SEQUENCE {
    cellAccessRelatedInfoFor-5GC-r15           SEQUENCE {
        cellBarred-5GC-r15                         ENUMERATED {barred, notBarred},
        cellAccessRelatedInfoList-5GC-r15          SEQUENCE (SIZE (1..maxPLMN-1-r14)) OF
                                                       CellAccessRelatedInfo-5GC-r15
                                                                                    OPTIONAL,   -- NEED OP
    }                                                                               OPTIONAL
    nonCriticalExtension                       SEQUENCE {}
}

CellAccessRelatedInfo-5GC-r15 ::=   SEQUENCE {
    plmn-IdentityList-5GC-r15               PLMN-IdentityList-r15,
    trackingAreaCode-5GC-r15                TrackingAreaCode-5GC-r15,
    cellIdentity-5GC-r15                    CellIdentity-5GC-r15
}

PLMN-IdentityList-r15::=    SEQUENCE (SIZE (1..maxPLMN-r11)) OF PLMN-IdentityInfo-r15

PLMN-IdentityInfo-r15 ::=   SEQUENCE {
    plmn-Identity-5GC-r15           CHOICE{
        plmn-Identity-r15               PLMN-Identity,
        plmn-index-r15                  INTEGER (1..maxPLMN-r11)
    },
    cellReservedForOperatorUse-r15  ENUMERATED {reserved, notReserved}
}

CellIdentity-5GC-r15 ::=    CHOICE{
    cellIdentity-r15                CellIdentity,
    cellId-index-r15                INTEGER (1..maxPLMN-r11)
}
```

*FIG. 6*

```
MeasResultEUTRA ::=        SEQUENCE {
    physCellId                 PhysCellId,
    cgi-Info                   SEQUENCE {
        cellGlobalId               CellGlobalIdEUTRA,
        trackingAreaCode           TrackingAreaCode,
        plmn-IdentityList          PLMN-IdentityList2              OPTIONAL
    }                          OPTIONAL
    cgi-Info-5gc-r15           SEQUENCE {
        cellGlobalId5GC            CellGlobalIdEUTRA,
        trackingAreaCode5GC        TrackingAreaCode5GC,
        plmn-IdentityList5GC       PLMN-IdentityList2              OPTIONAL
    }
}
```

FIG. 8A

```
MeasResultEUTRA ::=        SEQUENCE {
    physCellId                 PhysCellId,
    cgi-Info                   SEQUENCE {
        cellGlobalId               CellGlobalIdEUTRA,
        trackingAreaCode           TrackingAreaCode,
        plmn-IdentityList          PLMN-IdentityList2              OPTIONAL
    }                          OPTIONAL
    cgi-Info-5gc-r15           SEQUENCE {
        cellGlobalId5GC            CellGlobalIdEUTRA-5GC,
        trackingAreaCode5GC        TrackingAreaCode5GC,
        plmn-IdentityList5GC       PLMN-IdentityList2-5GC          OPTIONAL
    }                          OPTIONAL
}

PLMN-IdentityList2-5GC ::=  SEQUENCE (SIZE (1..5)) OF PLMN-IdentityInfo-r15
CellGlobalIdEUTRA-5GC ::=    SEQUENCE {
    plmn-Identity              PLMN-IdentityInfo-r15,
    cellIdentity               CellIdentity-5GC-r15
}
PLMN-IdentityInfo-r15 ::=        SEQUENCE {
    plmn-Identity-5GC-r15          CHOICE{
        plmn-Identity-r15              PLMN-Identity,
        plmn-index-r15                 INTEGER (1..maxPLMN-r11)
    },
    cellReservedForOperatorUse-r15 ENUMERATED {reserved, notReserved}
}
CellIdentity-5GC-r15  ::=    CHOICE{
    cellIdentity-r15           CellIdentity,
    cellId-index-r15           INTEGER (1..maxPLMN-r11)
}
```

FIG. 8B

```
MeasResultEUTRA ::=        SEQUENCE {
    ...
    cgi-Info-5gc-r15           CellAccessRelatedInfo-5GC-r15       OPTIONAL
    }                          OPTIONAL
}

CellAccessRelatedInfo-5GC-r15 ::=   SEQUENCE {
    plmn-IdentityList-r15              PLMN-IdentityList-r15,
    trackingAreaCode-5GC-r15           TrackingAreaCode-5GC-r15,
    cellIdentity-5GC-r15               CellIdentity-5GC-r15
}
```

FIG. 8C

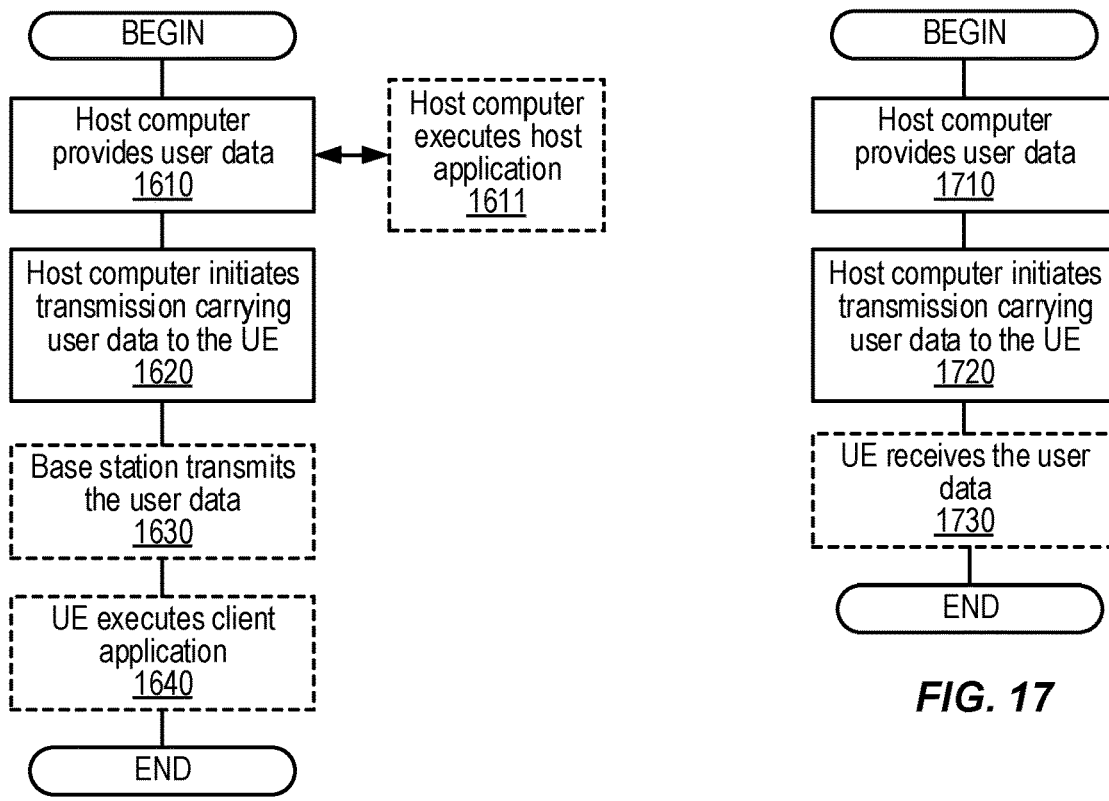
FIG. 16
FIG. 17
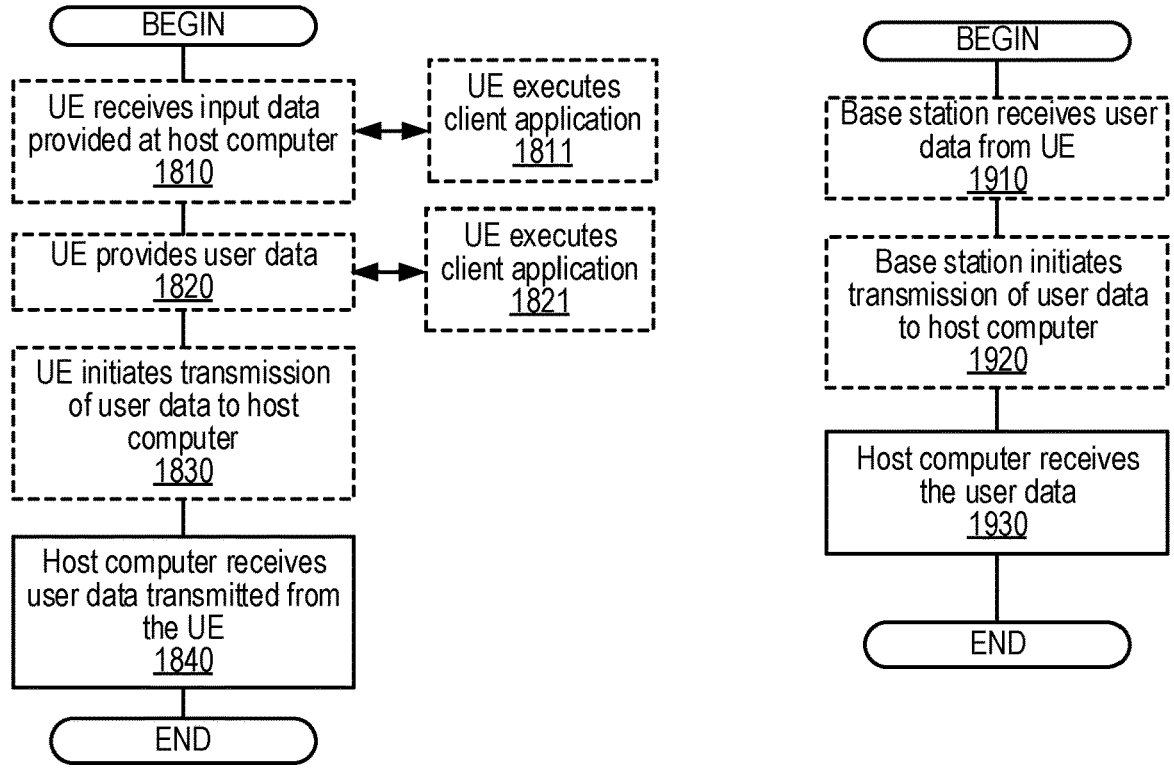
FIG. 18
FIG. 19

CELL GLOBAL IDENTIFIER, CGI, REPORTING OF ENHANCED LTE (ELTE) CELLS

TECHNICAL FIELD

The present application relates generally to the field of wireless communication systems, and more specifically to techniques that facilitate timely and efficient discovery and establishment of neighbor relations between network nodes a radio access network (RAN).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

In LTE, the Radio Resource Control (RRC) protocol is used to configure, setup, and maintain the radio connection between the user equipment (UE) and the base station, known as the evolved Node B (eNB). When the UE receives an RRC message from the eNB, it will apply the configuration (also referred to herein as "compile the configuration"), and if this succeeds the UE generates an RRC complete message that indicates the transaction ID of the message that triggered this response.

Since LTE Release 8, three Signaling Radio Bearers (SRBs), namely SRB0, SRB1 and SRB2 have been available for the transport of RRC and Non Access Stratum (NAS) messages between the UE and eNB. A new SRB, known as SRB1bis, was also introduced in rel-13 for supporting DoNAS (Data Over NAS) in NB-IoT.

SRB0 carries RRC messages using the CCCH logical channel, and it is used for handling RRC connection setup, resume, and re-establishment. Once the UE is connected to the eNB (i.e., RRC connection setup or RRC connection reestablishment/resume has succeeded), SRB1 is used for handling further RRC messages (which may include a piggybacked NAS message) and NAS messages, prior to the establishment of SRB2, all using DCCH logical channel. SRB2 is used for RRC messages such as logged measurement information, as well as for NAS messages, all using DCCH. SRB2 has a lower priority than SRB1, because logged measurement information and NAS messages can be lengthy and could cause the blocking of more urgent and smaller SRB1 messages. SRB2 is always configured by E-UTRAN after security activation.

A dual connectivity framework was initially defined in LTE Release 12. Dual connectivity (or DC) refers to a mode of operation in which a UE, in RRC CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). More generally, they can be referred to as a master node (MN) and a secondary node (SN). DC can be viewed as a special case of carrier aggregation (CA), where the aggregated carriers, or cells, are provided by network nodes that are physically separated from one another and that are not connected to one another through a fast, quality, connection.

More specifically, in DC, the UE is configured with a Master Cell Group (MCG) and a Secondary Cell Group (SCG). A Cell Group (CG) is a group of serving cells associated with either the MeNB or the SeNB(s). MCG and SCG are defined as follows:

The Master Cell Group (MCG) is a group of serving cells associated with the MeNB, including a primary cell (PCell) and optionally one or more secondary cells (SCells).

A Secondary Cell Group (SCG) is a group of serving cells associated with the SeNB including a Primary Scell (pSCell) and optionally one or more SCells.

Put another way, a UE in DC maintains simultaneous connections to anchor and booster nodes, where the anchor node is also referred to as the MeNB and the booster nodes are also referred to as SeNBs. As its name implies, the MeNB terminates the control plane connection towards the UE and, as such, is the controlling node of the UE, including handovers to and from SeNBs. For example, the MeNB is the eNB that terminates at least the S1-MME connection, i.e., the connection between the eNB and the Mobility Management Entity (MME) for the UE. An SeNB is an eNB that is providing additional radio resources (e.g., bearers) for the UE but that is not the MeNB. Types of radio resource bearers include MCG bearers, SCG bearers, and split bearers.

RRC connection with the UE is handled only by the MeNB and, accordingly, SRBs (Signaling Radio Bearers) are always configured as MCG bearer type and therefore only use the radio resources of the MN. However, the MeNB can also configure the UE based on input from the SeNB and hence the SeNB can also indirectly control the UE. In LTE-DC configuration, the MeNB is connected to the SeNBs via the Xn interface, which is currently selected to be the same as the X2 interface between the two eNBs.

According to LTE principles, UEs provide measurement reports—whether due to event trigger or a periodic trigger—comprising measurements of serving cell(s). For UE in LTE-DC, serving cell means both cells in MCG and cell in SCG. For mobility measurement, an MeNB configures a UE according to various criteria including, e.g., frequency to measure, how to report, etc. Correspondingly, the UE sends measurement results to the MeNB once the measurement criteria are met. When the UE sends a measurement report to the network, whether event-triggered or periodic-triggered, the UE should always include measurement results of its serving cell(s). For a UE in LTE-DC, "serving cells" includes cells in MCG (provided by MeNB) and cell(s) in SCG (provided by SeNB).

FIG. 1A illustrates various exemplary LTE DC scenarios involving UEs 110 and base stations (eNBs) 120. As shown, only one SeNB (at most) is connected to any of the illustrated UEs. However, more than one SeNB can serve a UE in general. Although FIG. 1A shows only one cell from each MeNB and SeNB serving the UE, the UE can have more than one serving cell from each, as discussed above. FIG. 1A also illustrates that dual connectivity is a UE-specific feature and that a given network node (or a serving cell) can support a dual-connected UE and a legacy UE at the same time. In other words, MeNB and SeNB are roles played, or functions provided, by eNBs 120 for a given UE. Thus, while the eNBs 120 in FIG. 1A are labeled "MeNB" and "SeNB," this indicates only that they are playing this role for at least one UE 110. Indeed, a given eNB 120 may be an MeNB for one UE 110 while being an SeNB for another UE.

The master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE. Furthermore, in LTE, only inter-frequency DC is supported (i.e., the MCG and SCG must use different carrier frequencies).

In summary, DC allows an LTE-capable UE to be connected to two nodes—MeNB and SeNB—and to receive data from both nodes, thereby increasing its data rate. The MeNB (or MN) provides system information, terminates the control plane (CP), and can terminate the user plane (UP). An SeNB (or SN), on the other hand, terminates only the UP. The aggregated UP protocol stack for LTE DC is illustrated in FIG. 1B and includes MCG bearers (terminated by MeNB), SCG bearers (terminated by SeNB), and split bearers (terminated by MeNB and SeNB). This UP aggregation achieves benefits such as increasing the per user throughput for users that have good channel conditions and the capability of receiving and transmitting at higher data rates than can be supported by a single node, even without a low-latency backhaul/network connection between the MeNB and SeNB.

In 3GPP, a study item on a new radio interface for 5G has recently been completed and 3GPP is proceeding to standardize the new radio interface, often abbreviated by NR (New Radio). At a minimum, NR can be deployed independently without any interworking with LTE, which can be referred to as NR stand-alone (SA) operation. In this mode, a NR gNB can be connected to 5G core network (5GC) and an LTE eNB can be connected to an EPC with no interconnection between them.

In addition, 3GPP TR 38.804 (v14.0.0) describes various exemplary DC scenarios or configurations where the MN and SN are applying either NR, LTE or both. The following terminology is used to describe these exemplary DC scenarios or configurations:

DC: LTE DC (i.e., both MN and SN employ LTE, as discussed above);

EN-DC: LTE-NR dual connectivity where LTE is the master and NR is the secondary. The NR secondary node (SN or gNB) relies on the LTE master node (MN or MeNB) for a control plane connection to the EPC core network (EPC). This is also referred to as "Non-standalone NW". In this case, the functionality of an NR SN cell is limited and would be used for connected mode UEs as a booster and/or diversity leg, but a UE cannot camp on nor be handed over to these NR cells.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR.

MR-DC (multi-RAT DC): a generalization of the Intra-E-UTRA Dual Connectivity (DC) described in 3GPP TS 36.300 (v15.2.0), where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC and NE-DC are two different example cases of MR-DC.

Since deployment and/or migration for these options may differ for different operators, it could be possible to have deployments with multiple options in parallel in the same network. In combination with LTE/NR DC solutions, it is also possible to support CA (Carrier Aggregation) in each cell group (i.e., MCG and SCG) and DC between nodes on same RAT (e.g., NR-NR DC). For the NR cells, a consequence of these different deployments is the co-existence of NR cells supporting SA only, NSA only, or both SA and NSA.

FIG. 2 is a block diagram showing a high-level comparison of the EN-DC, NE-DC, and NGEN-DC options briefly mentioned above. MR-DC using a 5G core network (5GC). In EN-DC (A), the NR gNB (SN) is operating in NSA mode and has no direct CP interface with the EPC. A gNB configured in this manner is often referred to as a "en-gNB".

In NE-DC (B), the NR gNB MN has direct CP and UP interfaces with the 5GC, while LTE eNB SN operates in NSA mode and has no direct CP interface with the 5GC. An eNB configured in this manner is often referred to as an "ng-eNB".

In NGEN-DC (C), an LTE eNB is the MN and an NR gNB is the SN similar to EN-DC (A), but the LTE eNB MN has direct CP and UP interfaces to 5GC instead of to EPC. An eNB configured in this manner is often referred to as an "ng-eNB", as mentioned above.

Although not shown in FIG. 2, the NR-NR DC control plane is still undergoing standardization. As such, it is possible that it could resemble LTE DC (i.e., UE has only one RRC terminated at the MN) or EN-DC (i.e., UE has two RRC terminations, one at the MN and another at the SN).

FIG. 3 illustrates various options for deploying a 5G network with or without interworking with existing LTE and EPC, according to current 3GPP standards. Option 1 depicts the legacy LTE standalone (SA) deployment where LTE eNBs are connected to an EPC. Option 2 depicts NR SA deployment where the NR gNBs are connected to a 5GC. Option 3/3A/3X depicts EN-DC, described above. Option 4/4A depicts NE-DC, described above. Option 5 depicts a hybrid solution where enhanced LTE (eLTE) eNBs (e.g., ng-eNBs) are connected to a 5GC. Finally, option 7/7A depicts NGEN-DC, described above.

Since LTE Rel-8, Automatic Neighbor Relations (ANR) has been standardized to enable an eNB to automatically establish a relationship with another eNB by facilitating an automatic setup of an X2 interface between the two eNBs. This can be done by the serving eNB configuring a UE with a physical cell identity (PCI) and a frequency to receive and/or measure (e.g., a measurement object), so that the UE reads the system information of the configured neighbor cell broadcast in System Information Block 1 (SIB1) and reports relevant received information such as cell global identifier (CGI), tracking area code (TAC), public land mobile network (PLMN) identifier, etc. to the serving eNB in a measurement report. The CGI is a globally unique identifier for a base station (e.g., eNB or gNB), and includes four parts: Mobile Country Code (MCC), Mobile Network Code (MNC), Location Area Code (LAC), and Cell Identification (CI). For eNBs, the CGI is referred to as "eCGI" and also includes an eNB-ID. As used herein, however, the term "CGI" encompasses globally unique identifiers for any type of base station, including eNBs and gNBs.

After receiving this report, the serving eNB can find the potential neighbor eNB and establish a neighbor relation (e.g., trigger the setup of an X2 connection). The neighbor information exchange, which occurs during the X2 Setup procedure or in the eNB Configuration Update procedure, may be used for ANR purpose.

In LTE releases subsequent to Rel-8 (e.g., Rel-13, Rel-14, Rel-15, etc.), however, there have been many changes to the way in which CGI-related information is provided by cells and acquired/reported by UEs. These differences also extended to the type of core network(s) (e.g., EPC only, 5GC only, or both EPC/5GC) associated with each cell. These differences can affect the functionality and/or performance of ANR, thereby creating problems, issues, and/or difficulties in the deployment of NR/5GC networks and their integration with UEs supporting various network functionality.

SUMMARY

Exemplary embodiments disclosed herein address these and other problems, issues, and/or drawbacks of existing solutions by providing a flexible and efficient approach for enabling a user equipment (UE) to report CGI of a serving cell upon request of a network node. In the same manner, exemplary embodiments also enable the network node to request such information and utilize it for timely, correct, and efficient performance of Automatic Neighbor Relations (ANR) with neighboring network nodes. Furthermore, such timely, correct, and efficient ANR can facilitates improved mobility of a UE between various cells in the RAN, even in the case where the UE is utilizing multi-RAT multi-connectivity.

Exemplary embodiments include various methods and/or procedures for a first node, configured to provide a serving cell to a UE in a radio access network (RAN), to determine core network types supported by a second node configured to provide one or more neighbor cells of the serving cell. The exemplary methods and/or procedures can be implemented, for example, by serving/source node (e.g., base station, eNB, gNB, ng-eNB, MNs, SNs, etc. or component(s) thereof or components thereof) with respect to a particular UE.

In some embodiments, the exemplary methods and/or procedures can include receiving, from the UE, a measurement report comprising a first cell identifier associated with a particular one of the neighbor cells. The exemplary methods and/or procedures can also include determining that the first cell identifier is not included in a neighbor relations table (NRT) maintained by the first node. The exemplary methods and/or procedures can also include sending, to the UE, a request to report a second cell identifier associated with the particular neighbor cell. The request can include the first cell identifier associated with the particular neighbor cell. In some embodiments, the second cell identifier can be a cell global identifier (CGI).

The exemplary methods and/or procedures can also include, based on the content of a report from the UE (e.g., in response to the request), determining one or more core network types supported by the particular neighbor cell. In some embodiments, the one or more core network types can be determined from a plurality of core network types, including a first core network type and a second core network type. For example, the first core network type can be one of an Evolved Packet Core (EPC) and a 5G Core (5GC), and the second core network type can be the other of the EPC and the 5GC.

In some embodiments, the exemplary method and/or procedure can also include determining whether to perform ANR with the second node based on the determination of one or more core network types supported by the particular neighbor cell.

Other exemplary embodiments include methods and/or procedures performed by a user equipment (UE). For example, these exemplary methods and/or procedures can be used to support ANR between a first node and a second node in a RAN, the first node being the UE's serving/source node.

In some embodiments, these exemplary methods and/or procedures can include sending, to first node configured to provide the UE's serving cell in the RAN, a measurement report including a first cell identifier associated with a neighbor cell provided by a second node in the RAN. In some embodiments, the first cell identifier can be a PCI.

The exemplary methods and/or procedures can also include receiving, from the first node, a request to report a second cell identifier associated with the neighbor cell. The request can include the first cell identifier associated with the neighbor cell. In some embodiments, the second cell identifier can be a CGI. The exemplary methods and/or procedures can also include receiving system information (SI) broadcast in the particular neighbor cell. For example, the SI can be cell-specific SI broadcast by the second node.

The exemplary methods and/or procedures can also include determining, based on the received system information, one or more types of core network supported by the particular neighbor cell. In some embodiments, the one or more core network types can be determined from a plurality of core network types, including a first core network type and a second core network type. For example, the first core network type can be one of an EPC and a 5GC, and the second core network type can be the other of the EPC and the 5GC. The exemplary methods and/or procedures can also include sending, to the first node, a report indicating the one or more core network types supported by the particular neighbor cell.

Other exemplary embodiments include network nodes (e.g., base stations, eNBs, gNBs, MNs, SNs, etc. or component(s) thereof) or user equipment (UEs, e.g., wireless devices, IoT devices, MTC devices, etc. or component(s) thereof) configured to perform operations corresponding to any of the exemplary methods and/or procedures described herein. Other exemplary embodiments include non-transitory, computer-readable media storing program instructions that, when executed by processing circuitry, configure such network nodes or UEs to perform operations corresponding to any of the exemplary methods and/or procedures described herein.

These and other objects, features and advantages of the exemplary embodiments of the present disclosure will become apparent upon reading the following Detailed Description in view of the Drawings briefly described below.

BRIEF DESCRIPTION OF THE DRAWINGS

FIGS. 5A-B show exemplary ASN.1 data structures representing two type-1 system information blocks (SIBs) that can be broadcast in an LTE network.

FIG. 5C shows an exemplary ASN.1 data structure for a MeasResultEUTRA message that can include a CGI report by a UE.

FIG. 6 shows an exemplary ASN.1 data structure representing another exemplary type-1 SIB that can be broadcast in an LTE network.

FIG. 8, which includes FIGS. 8A-C, shows various exemplary ASN.1 data structures associated with a MeasResultEUTRA message that can include a CGI report by a UE, according to various exemplary embodiments of the present disclosure.

FIGS. 16-19 are flow diagrams illustrating various exemplary methods and/or procedures implemented in a communication system, according to various exemplary embodiments of the present disclosure.

DETAILED DESCRIPTION

Figure 1A:
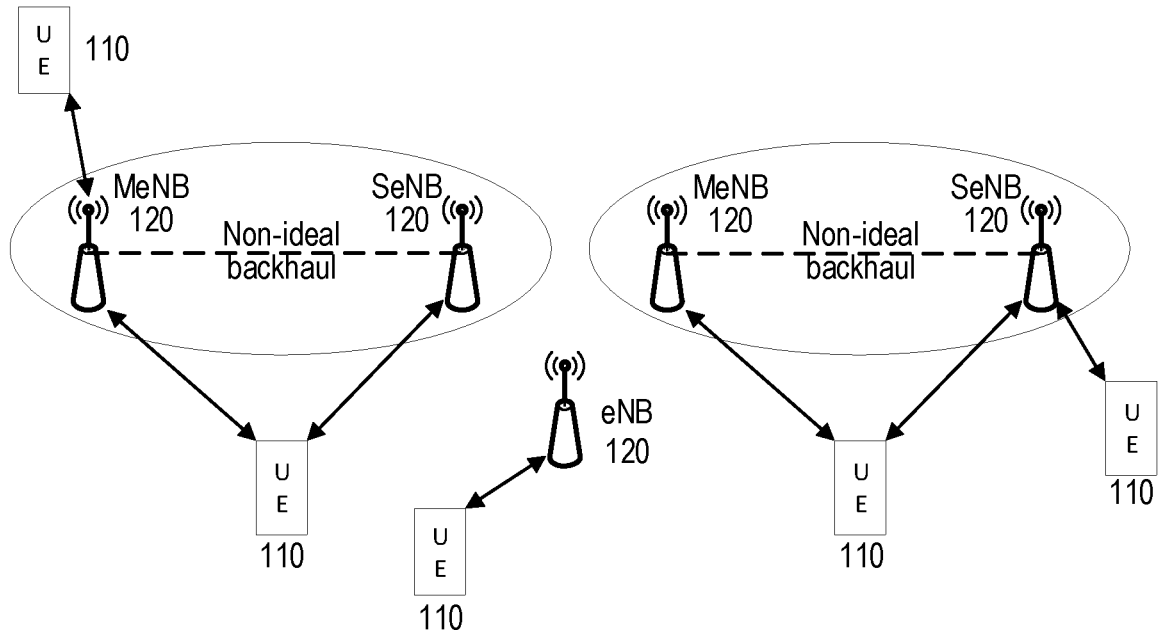
FIG. 1A is a high-level network diagram illustrating various exemplary Long-Term Evolution (LTE) dual-connectivity (DC) scenarios involving user equipment (UEs) and evolved NodeBs (eNBs).
Figure 1B:
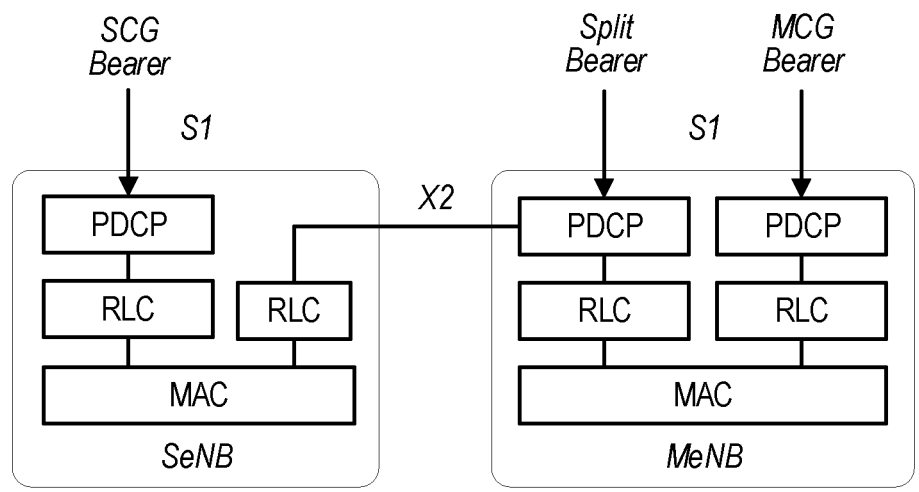
FIG. 1B shows an exemplary user plane (UP) protocol stack for LTE DC.
Figure 2:
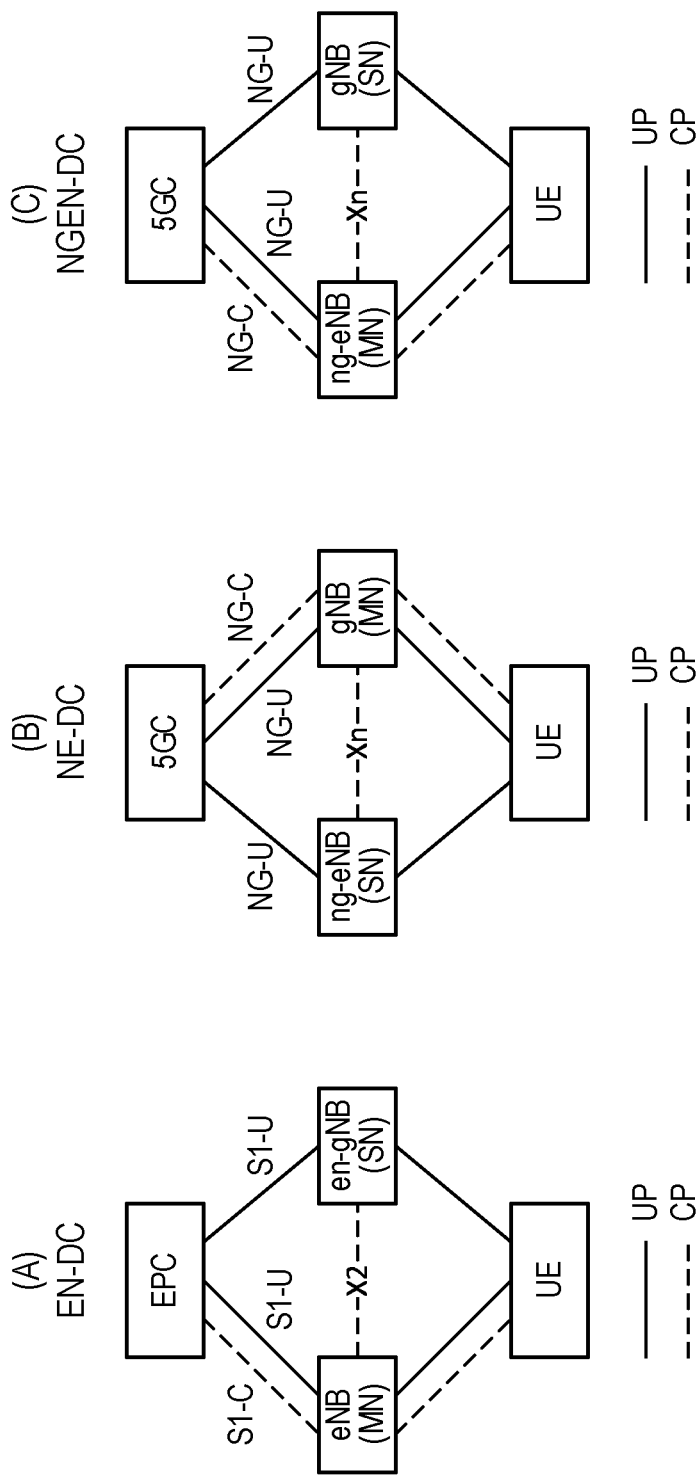
FIG. 2 is a block diagram showing a high-level comparison of the EN-DC, NE-DC, and NGEN-DC options.
Figure 3:
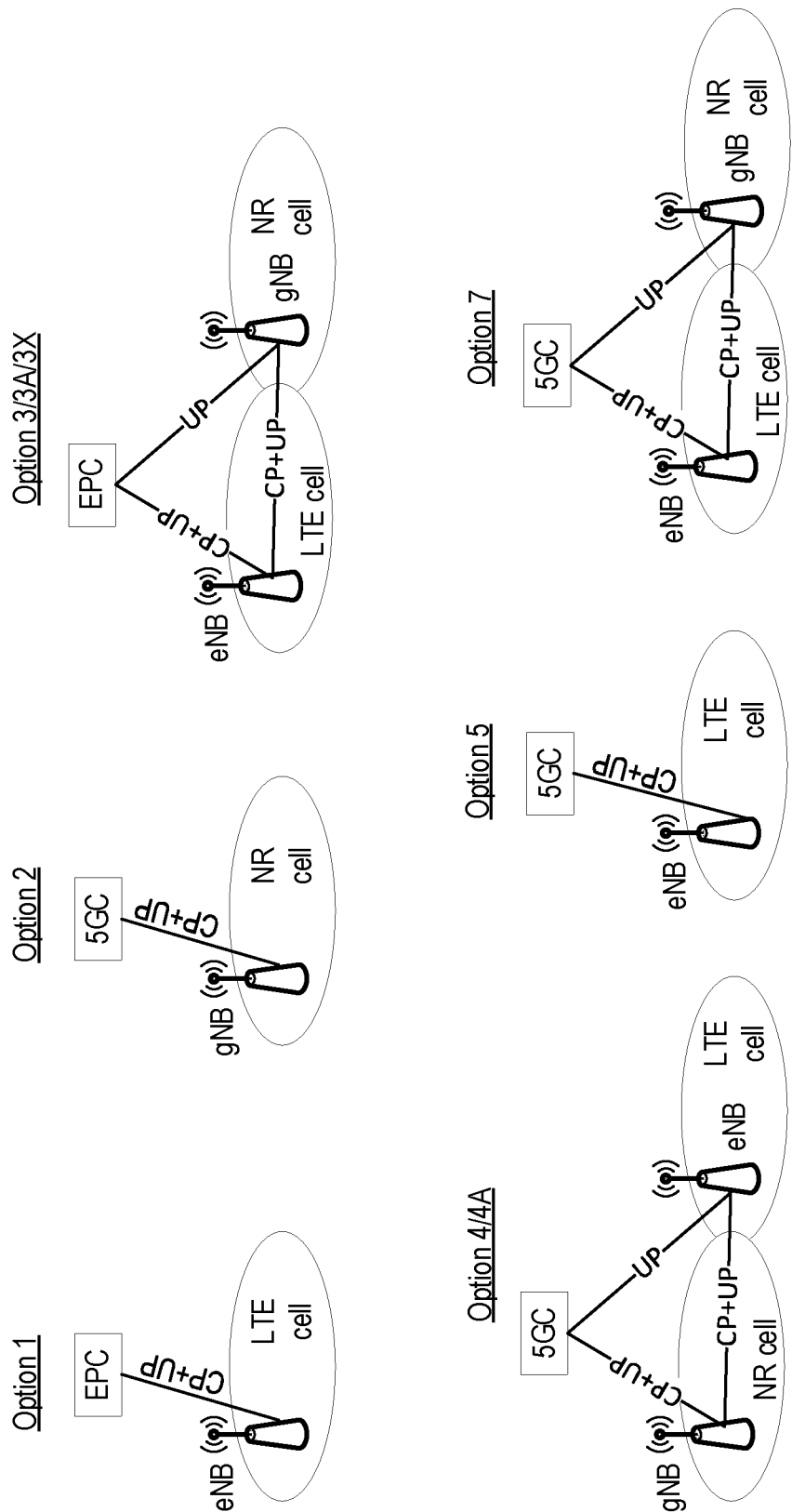
FIG. 3 illustrates various options for deploying a 5G network with or without interworking with existing LTE and Evolved Packet Core (EPC) networks, according to current 3GPP standards.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Furthermore, the following terms are used throughout the description given below:

Radio Node: As used herein, a "radio node" can be either a "radio access node" or a "wireless device."

Radio Access Node: As used herein, a "radio access node" (or "radio network node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Unless otherwise noted, the term "wireless device" is used interchangeably herein with "user equipment" (or "UE" for short). Some examples of a wireless device include, but are not limited to, a UE in a 3GPP network and a Machine Type Communication (MTC) device. Communicating wirelessly can involve transmitting and/or receiving wireless signals using electromagnetic waves, radio waves, infrared waves, and/or other types of signals suitable for conveying information through air.

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, in LTE releases subsequent to Rel-8 (e.g., Rel-13, Rel-14, Rel-15, etc.), there have been many changes to the way in which CGI-related information is provided by cells and acquired/reported by UEs. These differences also extended to the type of core network(s) (e.g., EPC only, 5GC only, or both EPC/5GC) associated with each cell. These differences can affect the functionality and/or performance of ANR, thereby creating problems, issues, and/or difficulties in the deployment of NR/5GC networks and their integration with UEs supporting various network functionality. This is discussed in more detail below.

Figure 4:
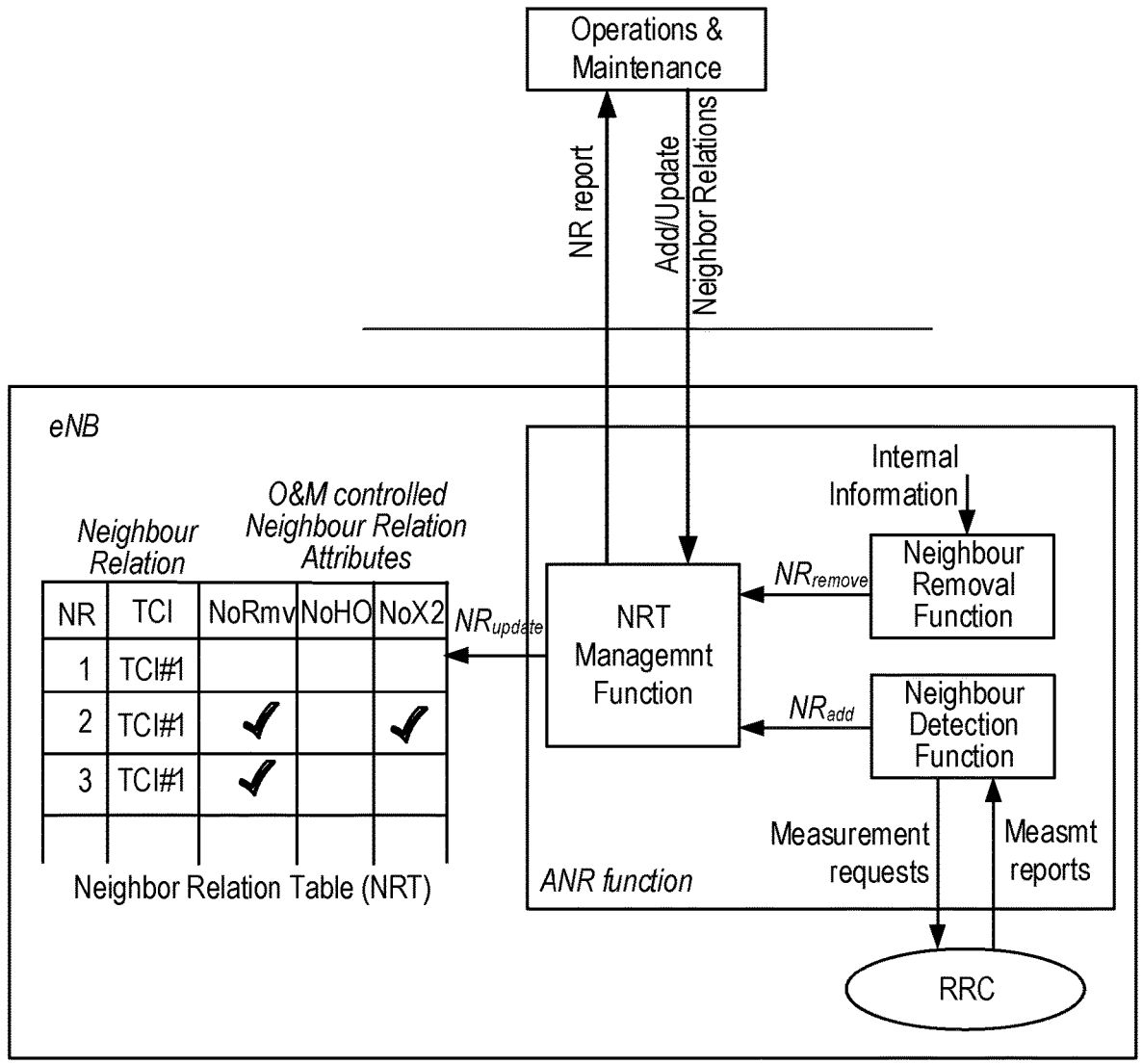
FIG. 4 illustrates an exemplary configuration and/or distribution of an Automatic Neighbor Relations (ANR) function in an LTE network between an eNB (eNB) and an Operations and Maintenance (O&M) node and/or function.

FIG. 4 illustrates the configuration of the ANR function between an eNB and an Operations and Maintenance (O&M) function in the LTE network. In this arrangement, the ANR function resides in the eNB and manages the conceptual Neighbor Relation Table (NRT). Located within ANR, the Neighbor Detection Function finds new neighbors and adds them to the NRT. In general, this is done by issuing measurement requests to, and receiving measurement reports, from the RRC function in the eNB. ANR also contains the Neighbor Removal Function which removes outdated neighbor relations from the NRT. This can be based on internal information, e.g., concerning past usage (or non-usage) of specific neighbor relations. The Neighbor Detection Function and the Neighbor Removal Function are implementation-specific but, as shown in FIG. 4, operate on the NRT via the NRT Management Function.

The NRT Management Function also allows O&M to manage the NRT. For example, O&M can add/delete neighbor cell relations and modify the attributes of the NRT via the NRT Management Function. The O&M system is informed about changes in the NRT made by the eNB through reports from the NRT Management Function.

In the context of ANR, a neighbor cell relation (NCR) can be explained as follows. An existing NCR from a source cell to a target cell means that eNB controlling the source cell: a) knows the ECGI/CGI and PCI of the target cell; b) has an entry in the NRT for the source cell identifying the target cell; and c) has the attributes in this NRT entry defined, either by O&M or set to default values. The source-cell eNB keeps a NRT for each source cell that the eNB provides. For each NCR, the NRT contains the Target Cell Identifier (TCI), which identifies the target cell. For E-UTRAN, TCI corresponds to the E-UTRAN CGI (ECGI) and the PCI of the target cell.

As shown in FIG. 4, each NCR has three attributes: NoRemove (or "NoRmv" for short), NoHO, and NoX2. If NoRemove is checked (e.g., indicated as positive in the NRT), the eNB shall not remove the particular NCR from the NRT. If NoHO is checked, the NCR shall not be used by the eNB for handover reasons. If NoX2 is checked, the Neighbor Relation shall not use an X2 interface in order to initiate procedures towards the eNB parenting the target cell. For the purposes of clarity, NCRs are cell-to-cell relations, while an X2 link is set up between two eNBs that provide the respective cells. Furthermore, NCRs are unidirectional, while an X2 link is bidirectional.

In the context of EN-DC, an existing NCR from a source E-UTRA cell to a target NR cell means that the eNB controlling the source cell knows the NCGI (NR CGI) and PCI of the target cell. An X2 link may be set up between eNB and en-gNB. The NoRemove, NoHO, and NoX2 attributes apply when the en-gNB provides the target cell. In addition, each NCR has the NoEN-DC attribute, which, if checked, means that the particular NCR shall not be used by the eNB for EN-DC.

Each E-UTRA cell contains an Inter Frequency Search list that indicates all frequencies that shall be searched. The PCI is defined by the carrier frequency (measurement object associated to the SSB associated to that cell) and NR-PCI. The eNB can use the PCI reported by the UE to look up NCGI, TAC, and supported PLMN-ID(s) in O&M provisioned information or in information received on the X2 interface.

To support RAN sharing, 3GPP TS 36.331 (V15.2.0) allows inclusion of a list of PLMNs in System Information Block 1 (SIB1) broadcast by a cell, with all PLMNs in the list associated with the same TAC and cell-ID. More specifically, in the plmn-identityList, the first listed PLMN-identity is the primary PLMN and subsequent PLMN-identity values in the list are secondary PLMNs. In addition, all members of the plmn-identityList are associated with a single trackingAreaCode and a single cellIdentity included in the message. This is illustrated in an exemplary ASN.1 data structure shown in FIG. 5A.

Hence, upon being configured with CGI report, the specifications define that a Rel-8 UE acquires the first PLMN in the broadcasted PLMN list and creates the CGI. Then, it acquires the TAC and cell-ID, and the list of remaining PLMNs. After the introduction of CN sharing in Rel-14, it became possible to associate a particular cell with different CNs as well as different PLMNs. As such, the structure of the PLMN-related information has been re-defined in SIB1 as a list of CellAccessRelatedInfo instead of a single element. This is illustrated in the exemplary ASN.1 data structure shown in FIG. 5B. Note that in this arrangement, the LTE E-UTRAN configures at most six (6) PLMNs in total across all the PLMN lists in SIB1.

FIG. 5C shows an exemplary ASN.1 data structure for a MeasResultEUTRA IE, which can include the CGI report by the UE as discussed above. In particular, MeasResult-EUTRA includes a cgi-Info field, which includes cellGlobalId, trackingAreaCode, and plmn-identityList fields. The cellGlobalId includes a plmnIdentity field and a CellIdentity field, while the plmn-identityList includes five additional PLMN-identity fields. Accordingly, a Rel-8 UE that reads the cellAccessRelatedInfo field selects the first PLMN in the list and the cellIdentity to construct the cellGlobalId, and includes the remaining PLMNs of the list in the reported plmn-IdentityList.

On the other hand, a Rel-14 UE is required to perform a more complicated operation. First it needs to check whether a list of cell-access-related information is included in SIB1 (e.g., field cellAccessRelatedInfoList-r14). If it is, then the UE acquires the CGI-related information from that field by first trying to find its registered PLMN from the list of PLMN lists. If the UE finds it, the UE then acquires the associated TAC, cell identity, and the remaining PLMNs sharing the acquired TAC and cell identity. This is functionally equivalent to the UE only reporting CGI information associated to the registered PLMN and equivalent ones sharing the same CN. These procedures are specified in 3GPP TS 36.331 (V15.2.0) as follows:

5.5.3 Performing measurements
5.5.3.1 General
. . .
The UE shall:
. . .
  1> for each measId included in the measIdList within VarMeasConfig:
    2> if the purpose for the associated reportConfig is set to reportCGI:
. . .
    3> try to acquire the global cell identity of the cell indicated by the cellForWhichToReportCGI in the associated measObject by acquiring the relevant system information from the concerned cell;
    3> if an entry in the cellAccessRelatedInfoList includes the selected PLMN, acquire the relevant system information from the concerned cell;
    3> if the cell indicated by the cellForWhichToReportCGI included in the associated measObject is an E-UTRAN cell:
      4> try to acquire the CSG identity, if the CSG identity is broadcast in the concerned cell;
      4> try to acquire the trackingAreaCode in the concerned cell;
      4> try to acquire the list of additional PLMN Identities, as included in the plmn-IdentityList, if multiple PLMN identities are broadcast in the concerned cell;
      4> if cellAccessRelatedInfoList is included, use trackingAreaCode and plmn-IdentityList from the entry of cellAccessRelatedInfoList containing the selected PLMN;
. . .
NOTE 2: The 'primary' PLMN is part of the global cell identity.
. . .
5.5.4 Measurement report triggering
5.5.4.1 General
If security has been activated successfully, the UE shall:
  1> for each measId included in the measIdList within VarMeasConfig:
. . .
    2> if the purpose is included and set to reportCGI and if the UE acquired the information needed to set all fields of cgi-Info for the requested cell:
      3> include a measurement reporting entry within the VarMeasReportList for this measId;
      3> set the numberOfReportsSent defined within the VarMeasReportList for this measId to 0;
      3> stop timer T321;
      3> initiate the measurement reporting procedure, as specified in 5.5.5;
. . .
5.5.5 Measurement reporting
5.5.5.1 General
For the measId for which the measurement reporting procedure was triggered, the UE shall set the measResults within the MeasurementReport message as follows:

1>set the measId to the measurement identity that triggered the measurement reporting;
. . .
  1>if there is at least one applicable neighboring cell to report:
. . .
    2>set the measResultNeighCells to include the best neighboring cells up to maxReportCells in accordance with the following:
. . .
      3>else if the purpose is set to reportCGI:
        4>if the mandatory present fields of the cgi-Info for the cell indicated by the cellForWhichToReportCGI in the associated measObject have been obtained:
. . .
        5>else:
          6>include the cgi-Info containing all the fields that have been successfully acquired and in accordance with the following:
            7>include in the plmn-IdentityList the list of identities starting from the second entry of PLMN Identities in the broadcast information;

To support LTE with 5GC (e.g., eLTE), it has been agreed to define another list of PLMN access information, in addition to existing lists defined up through Rel-14. In other words, LTE cells supporting 5GC UEs should broadcast access information including TAC, PLMN list, and cell-ID for legacy UEs (i.e., through Rel-13), an optional list of acsessRelatedInfo defined in Rel-14, and the list for 5GC UEs defined in Rel-15. In NR networks, however, there is only one list for PLMN since all PLMNs are connected to 5GC only and there is no requirement for CN indication per PLMN.

Furthermore, it has been agreed to have two lists of PLMN for eLTE: a legacy PLMN list for EPC PLMN, and a 5GC PLMN list for PLMN connected to 5GC. This will include indexing of PLMN and cell-ID in the 5GC PLMN list (e.g., in case a PLMN supports both EPC and 5GC), along with a CN indication per PLMN. The exact method to indicate the CN per PLMN is not agreed yet. For 5GC-only cells, however, the following solution has been agreed upon to prevent legacy UE's camping on a 5GC-only cell:

The cell is barred (cellBarred is set to barred);
  Put any PLMN and cell ID in existing PLMN list (does not matter whether they are real value or not, as no UE will use it); and
  The new list is used to advertise all PLMNs with full PLMN IDs (and their cell access information) for 5GC connectivity.

The agreements described above can be expressed in the exemplary ASN.1 data structure shown in FIG. 6. However, no solution is agreed for the following issues:

How SIB1 content is determined for the different types of cells (5GC only, EPC only, both 5GC/EPC) so that meaningful CGI information can be obtained by different types of UEs (>=Rel-8<=Rel-13, >=Rel-14, 5GC UEs) configured by a given node (which can be LTE or NR node);
  What information is obtained from SIB1 from these different types of UEs;
  What information is included in the CGI reporting, in particular for 5GC UEs; and
  How the network can interpret and perform actions based on CGI report from these different types of UEs regarding these different types of cells;

As mentioned above, ANR measurements of LTE cells involves sending a CGI report for the selected cell which includes a CGI information with the TAC, cell ID and PLMN of the primary PLMN, along with a list of all the PLMN in that cell. However, there are multiple problems in CGI reporting in eLTE, including but not limited to the particular problems discussed below.

Unclear definition of the Primary PLMN: In CGI reporting for LTE, the UE needs to determine the primary PLMN in order to build the CGI, which includes the cell identity and primary PLMN. However, since there are two PLMN lists in eLTE, it is unclear how a UE would interpret the action of including a Primary PLMN in the currently standardized CGI reporting. This is particularly unclear for 5GC UEs, which would in principle be able to acquire information from both lists.

Handling of 5GC-only cells: Based on the agreement that there will be separated lists of cell-access-related information per CN type (one for EPC, another for 5GC), a legacy UE would anyway try to acquire the EPC list (with CGI related info) in a 5GC-only cells and report to the network. Since the fact that the cell does not support EPC is unknown to the serving node receiving the report, it is unclear how the serving node should interpret the report and what actions it should take in response (e.g., setup of interface, building neighbor relation, configuration of subsequent report, mobility decision, etc.). That impacts what kind of information should be broadcast by the network in SIB1 in the different lists of cell-access-related information per CN type, particularly for 5GC-only cells Handling of EPC-only cells and EPC/5GC cells: For EPC-only cells, since there will be separated lists of cell-access-related information per CN type (one for EPC, another for 5GC), it is unclear what should be acquired and reported by a 5GC UE.

Undefined behavior for eLTE ANR reporting to legacy macro nodes: It is also undefined how legacy macro nodes would be able to receive ANR reports with 5GC TAC information. Also, the behavior of Rel-8, Rel-14 and Rel-15 UE for ANR reporting of eLTE cell needs to be considered and defined.

A previous solution configured a UE to acquire the CN information for LTE cells in case the UE connects to EPC or 5GC. This solution proposed the UE sending a report, to a serving node, indicating whether a particular neighbor LTE cell detected by the UE was connected to an EPC or to a 5GC. However, this solution only considered Rel-15 UEs which were capable of detecting this 5GC information. Furthermore, this solution only took into account the SIB1 structure existing at that time, and neither considered nor anticipated the subsequent progress of 3GPP standardization of SIB1 structure. More specifically, this previous solution did not take into account the two lists of cell-access-related information per CN type, nor the different issues caused by the existence of different types of UEs and cells in a given deployment.

Exemplary embodiments of the present disclosure address these and other problems and/or shortcomings of prior solutions by providing flexible mechanisms for a user equipment (UE) to acquire and report CGI information for a configured cell, e.g., a cell that can be associated to different CN types. Various exemplary embodiments are directed to operation in the context of LTE cells, which can either be connected to EPC, 5GC or both 5GC/EPC. Even so, the principles of these embodiments are applicable to a cell, utilizing any type of RAT, that could be connected to different CN types.

In some embodiments, a UE can determine that a configured cell does NOT support 5GC by acquiring the barring flag set per CN type (in this case for 5GC) broadcasted in SIB1, e.g., cellBarred-5GC-r15. If cellBarred-5GC-r15 is set to 'barred', the UE interprets that cell as not supporting 5GC. Otherwise, if cellBarred-5GC-r15 is set to 'notBarred', the UE considers the cell as possibly supporting 5GC and can acquire further information to confirm that determination. These exemplary embodiments can be performed by UEs operable with a 5GC ("5GC UEs").

In other embodiments, a UE can determine that a given cell does NOT support 5GC by detecting the absence of a cell-access-related information for 5GC (e.g., cellAccessRelatedInfoList-5GC-r15), such as the absence of the list in SIB1. These exemplary embodiments can be performed by 5GC UEs.

In other embodiments, a UE can determine that a configured cell supports 5GC by the presence of a cell-access-related information for 5GC, such as the list in SIB1 (e.g., cellAccessRelatedInfoList-5GC-r15). These exemplary embodiments can be performed by 5GC UEs.

In other embodiments, a UE can determine that a configured cell does NOT support EPC by acquiring the setting of a barring flag set per CN type (in this case for EPC), e.g., cellBarred broadcasted in SIB1. if cellBarred is set to 'barred', UE interprets that cell as not supporting EPC. These embodiments can be performed by 5GC UEs. In a particular one of these embodiments, if cellBarred is set to 'barred', the UE interprets that cell as not supporting EPC if the cell-access-related information for 5GC is present (i.e., it is a 5GC-only cell). Otherwise, if cellBarred is set to 'notBarred', the UE determines that the cell may possibly support EPC, the final determination depending on other content of the cell-access-related information for EPC (e.g., cellAccessRelatedInfo and/or cellAccessRelatedInfoList-r14).

In other embodiments, a UE can determine that a configured cell does not support EPC by identifying the presence of specific content in cell-access-related information for EPC, e.g., pre-defined information that indicates no EPC support. In one particular embodiment, the predefined information can be a specific PLMN value (e.g., 0) in the first element of plmn-IdentityList in cellAccessRelatedInfo, or the first element of plmn-IdentityList in cellAccessRelatedInfo in the cellAccessRelatedInfoList associated to the selected PLMN for that UE.

In various embodiments, when measuring a configured cell that supports both 5GC and EPC, the UE can also acquire CGI related information per CN type (such as TAC, cell identity, primary PLMN, RAN area code, etc.); This can be done, e.g., by acquiring the cell-access-related information list(s), one for EPC and one for 5GC.

In various embodiments, if the configured cell is broadcasting multiple PLMN lists (each list associated to a different CN type, e.g., EPC and 5GC), the UE can determine at least one primary PLMN associated to the configured cell. Further, based on this determination of a primary PLMN, the UE can create at least one CGI comprised of cell identifier and primary PLMN. The at least one CGI would be included in the UE's CGI report. For example, the UE can create a CGI for each CN type with different PLMNs and/or cell identities, and include the CGIs created in this manner in the CGI report.

For example, for cells supporting both EPC and 5GC, such a report can include at least the following: 1) TAC for EPC, cell identity for EPC, primary PLMN for EPC; and 2) TAC for 5GC, cell identity for 5GC, primary PLMN for 5GC. On the other hand, if the UE determines that a cell does not support a particular CN type (e.g., EPC or 5GC), the UE includes the above information only for the other CN type(s) that the cell does support, as indicated explicitly or implicitly in the SIB1 broadcast.

In various embodiments, the UE can structure the information provided in the CGI report to avoid repeating information common to multiple reported CN types, e.g., by indexing of common information for the different CN types. For example, a common PLMN value defined for 5GC and EPC (e.g., the primary PLMN in the case of the CGI), a common cell identifier, and/or common information regarding carriers/frequencies can be indexed in this manner. In some embodiments, the reported TAC can comprise a different number of bytes as a way to indicate the network the CN type support.

In addition to the various embodiments directed to UE operation, other embodiments directed to network operations can be used cooperatively with these UE-directed embodiments. For example, the exemplary UE embodiments are primarily applicable to UEs supporting 5GC, as these are newly defined. However, to support legacy UEs that are only capable of reading the cell-access-related information (e.g., lists) defined for EPC, exemplary network-related embodiments can broadcast information (encoded in various ways, described below) in SIB1 to indicate that a configured cell is associated with EPC only, 5GC only, or both 5GC/EPC.

In certain embodiments, a network node serving a 5GC-only cell can broadcast cell access information that includes a pre-defined PLMN value (e.g., PLMN-x) that is understood by the network (and not necessarily by legacy UEs) to mean that the particular cell is 5GC only. Upon receiving a report including PLMN-x from a legacy UE configured to read that cell, the configuring node will identify that the configured cell as being 5GC-only.

In other embodiments, a network node serving a 5GC/EPC cell can broadcast cell access information that includes a further pre-defined PLMN value (e.g., PLMN-y) that is understood by the network (but not necessarily by legacy UEs) to mean that the particular cell is 5GC only. Upon receiving a report including PLMN-y from a legacy UE configured to read that cell, the configuring node will identify that the configured cell as being 5GC-only.

These and other exemplary embodiments of the present disclosure provide various advantages and specific improvements to operation of networks and UEs. For example, the embodiments improve operation of ANR by facilitating a UE to report CGI information from cells with connected to both EPC and 5GC. Improvements in ANR functionality reduces the need for manual planning of neighboring cell relations in the network.

As another example, the embodiments improve network performance as experienced by end users. If multiple LTE cells are reported and some of them are connected with the same CN as the serving node, these should be prioritized for UE mobility procedures. As such, knowing which LTE cell is connected to which CN is beneficial for mobility management by a node serving an end-user device (e.g., UE).

Figure 7:
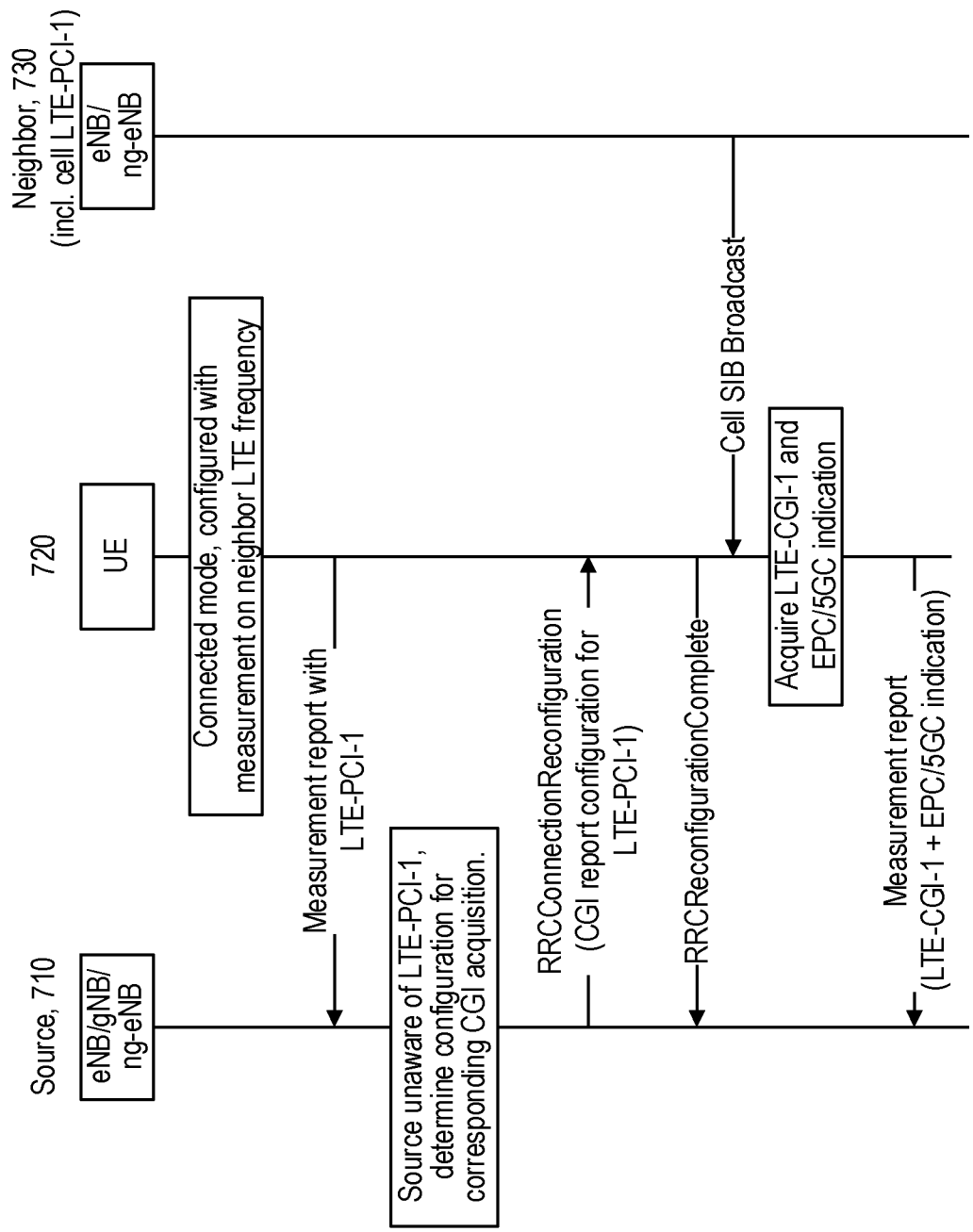
FIG. 7 shows a signal flow diagram of an exemplary procedure for configuration and performance of a CGI measurement made on a neighbor node in a radio access network (RAN) to support ANR, according to various exemplary embodiments of the present disclosure.

These embodiments are illustrated by FIG. 7, which shows a signal flow diagram of a procedure for configuration (by a source or serving node, 710) and performance (by a UE, 720) of a CGI measurement made on a neighbor node (730) in a radio access network (RAN). As discussed above in relation to FIG. 4, CGI reporting can be used to support ANR functionality, whereby the UE is requested to read the content (including CGI) of SIB1 broadcast by neighbor cells to assist the source node (eNB/gNB/ng-eNB) to facilitate ANR with the neighbor cell(s). CGI measurement is often requested when the UE has reported an unknown PCI (Physical Cell Identity) (i.e., an unknown neighbor cell). PCI is included in all UE measurement reports that are initiated for different purposes, even unrelated to ANR. When the source node has acquired information about a neighbor cell, this information is stored in the NRT and, as needed, used to setup X2/Xn connection between the nodes, which can be used for various procedures including handover, dual connectivity setup, etc.

As shown in FIG. 7, after a UE reports an unknown PCI in a measurement report to the serving node, the serving node then sends an RRCConnectionReconfiguration message comprising a CGI Configuration information element (IE), which configures the UE to read and report the CGI from the SIB1 broadcast by the neighbor cell associated with the unknown PCI.

In some embodiments, the UE configured to report CGI in this manner determines that the neighbor cell supports 5GC by the presence of a 5GC related list, such as the cell-access-related information list in SIB1 (e.g., cellAccessRelatedInfoList-5GC-r15).

In other embodiments, the UE configured to report CGI in this manner first determines whether the neighbor cell is barred for each CN type. If the neighbor cell if barred for CN-x (EPC) and not for CN-y (5GC), the UE skips (e.g., does not read) the cell-access-related information (or list) for CN-x that was determined to be barred. For example, the UE can skip over Rel-8 and Rel-14 PLMN lists related to EPC, after determining that the cell is barred for EPC. In this manner, the UE would only read the Rel-15 PLMN list and use it for reporting CGI. As another example, if the UE determines that the neighbor cell if bared for 5GC but not for EPC, the UE skips the cell-access-related information list for 5GC, and only reads the Rel-8 and Rel-14 PLMN lists related to EPC.

In other embodiments, if the UE configured to report CGI in this manner is a Rel-15 UE, the UE can read the Rel-8 and Rel-14 PLMN lists even if the cell is barred for EPC. The UE would include the PLMN from EPC list or 5GC list in the CGI report, depending on the respective barring settings. For example, if the barring flag is set for either of the EPC PLMN list or the 5GC PLMN list, the UE would omit the barred PLMN from the CGI report. If the legacy cellbarred flag is not set but a dummy value is included, the Rel-15 UE can report the dummy PLMN indicating to the serving node that the reported cell only supports 5GC.

In other embodiments, if the UE configured to report CGI in this manner is a Rel-15 UE, and is configured to report CGI for a neighbor LTE cell that is connected to both EPC and 5GC, the UE can report the primary PLMN from EPC PLMN list and the primary PLMN from Rel-15 PLMN list separately. For example, the UE's CGI report can include: 1) Primary PLMN from Rel-8/Rel-14 PLMN list+TAC+Cell ID+Remaining PLMN from that list; and 2) Primary PLMN from Rel-15 PLMN list+TAC+Cell ID+Remaining PLMN from that list.

In other embodiments, if the Rel-15 UE determines from reading the SIB1 that either PLMN list (Rel-8/Rel-14 or Rel-15) is barred, the UE's CGI report would not include information associated with the barred PLMN list. This could be achieved by a format in which all information from EPC PLMN list precedes the information from 5GC PLMN list. In case information from EPC PLMN list is not included, the report can begin with information pertaining to 5GC PLMN list.

In other embodiments, if the Rel-15 UE determines from reading the SIB1 that either PLMN list (Rel-8/Rel-14 or Rel-15) is not barred but that there is a non-matching dummy PLMN included in that list, the UE's CGI report would not include information associated with that list.

In other embodiments, if a Rel-15 UE is configured to report CGI of a neighbor LTE cell connected to both 5GC and EPC, by an LTE source node connected only to EPC, the UE can report only the PLMN and TAC from EPC PLMN list and not report the PLMN and TAC from 5GC PLMN list, whether or not the UE read the 5GC PLMN list in SIB1. In other words, the UE's decision on CGI reporting can be based, at least in part, on the configuration of the source node requesting the report.

In other embodiments, a network node serving an eLTE cell (i.e., LTE connected to 5GC) can be configured to broadcast CGI-related information in various ways such that Rel-15 and legacy (e.g., Rel-8) UEs can properly report CGI to facilitate ANR between the network node and the source node serving these UEs. In some embodiments, an eLTE cell can be configured to broadcast a dummy PLMN that does not match any PLMNs in that network. Choosing a non-matching dummy PLMN in this manner can prevent legacy UEs from reporting it to the requesting source node, which can lead to incorrect ANR configuration. According to these embodiments, when a legacy UE is configured to report CGI measurements for an eLTE neighbor cell, the UE reads the legacy SIB1 (e.g., PLMN list, TAC, cell-ID). If the UE reads the dummy PLMN from this list and determines that it does not match the UE's selected/registered PLMN, the UE does not include it in the CGI report, but instead sends an empty CGI report as currently standardized.

In other embodiments, a network node serving a 5GC-only cell (i.e., eLTE or NR-5GC) can be configured to broadcast a non-matching dummy PLMN as the first entry in each non-empty element of Rel-14 CellAccessInfoList. In some of these embodiments, each non-empty element of this IE also includes all the PLMNs from neighboring cells following the dummy PLMN. This would help the serving node to know that the reported cell is configured with 5GC only. Alternately, the Rel-14 UE can only report the primary dummy PLMN and associated TAC but not report the remaining PLMNs. The UE would report this information since it would find its registered PLMN in the Rel-14 CellAccessInfoList list. These exemplary embodiments can be particularly useful in scenarios when some PLMNs support both EPC and 5GC and they are included in legacy list although the cell does not have connectivity to EPC.

In other embodiments, only a dummy PLMN and TAC is added in the legacy Rel-8 and Rel-14 PLMN lists. In this case, the UE would not find the registered PLMN in a non-empty Rel-14 CellAccessInfoList, and would send an empty CGI report. More generally, if none of the lists in the CellAccessInfoList-r14 include the registered PLMN of the UE, the Rel-14 UE would follow the same mechanism as legacy Rel-8 UE and report an empty CGI report.

Although the exemplary embodiments presented above have primarily focused on CGI reporting of LTE cells, the serving/source/configuring node can be a node associated with LTE, NR, or both LTE and NR. For example, the serving node can be an eNB connected to EPC, a gNB connected to 5GC where the UE has an LTE serving cell, an en-gNB connected to EPC where the UE has an NR serving cell, or a gNB connected to 5GC where the UE has an NR serving cell. As such, the embodiments discussed above can be implemented by various changes to existing 3GPP TS 36.331 and 38.331, RRC specifications of LTE/E-UTRAN and NR/NG-RAN, respectively. Several of exemplary RRC specification changes are presented below.

FIG. 8, which includes FIGS. 8A-C, shows various exemplary ASN.1 data structures associated with a MeasResult-EUTRA message that can include a CGI report by a UE, according to various exemplary embodiments of the present disclosure. Such exemplary data structures can be incorporated, for example, in 3GPP TS 36.331 (for LTE) and/or 3GPP TS 38.331 (for NR).

FIG. 8A shows an exemplary ASN.1 data structure for reporting CGI information for an LTE cell. This structure includes a physCellId (e.g., PCI) and CGI information for the LTE cell with respect to both EPC and 5GC. Each CGI information includes a list of PLMN identities (such as defined in FIG. 5C) associated with the cell for the particular core network.

FIG. 8B shows another exemplary ASN.1 data structure for reporting CGI information for an LTE cell. This data structure is similar to the one shown in FIG. 8A, except that a more optimized structure based on indexing is used for the PLMN identity list associated with the 5GC. The definition of this indexing structure is also given in FIG. 8B. In addition, the CellGlobalIdEUTRA-5GC IE specifies the Evolved Cell Global Identifier (ECGI), which is a globally unique identity of a cell in E-UTRA that is connected to 5GC. In case the CGI for cells connected to EPC is reported in the same message, an index to that can be included instead.

Furthermore, exemplary complementary changes to relevant measurement reporting procedures specified in 3GPP TS 36.331 (V15.2.0) for LTE/E-UTRAN include the following (indicated by underline). Procedures specified in 3GPP TS 38.331 (V15.2.1) for NR/NG-RAN can be adapted in a similar manner. Note that there are no changes to the section 5.5.4 ("Measurement Report Triggering"), which indicates that no special trigger for 5GC CGI report is required.

5.5.3 Performing measurements
5.5.3.1 General
. . .
The UE shall:
. . .
  1> for each measId included in the measIdList within VarMeasConfig:
    2> if the purpose for the associated reportConfig is set to reportCGI:
. . .
      3> try to acquire the global cell identity of the cell indicated by the cellForWhichToReportCGI in the associated measObject by acquiring the relevant system information from the concerned cell;
      3> if an entry in the cellAccessRelatedInfoList includes the selected PLMN, acquire the relevant system information from the concerned cell;
      3> if an entry in the cellAccessRelatedInfoList-5GC includes the selected PLMN or an index associated to an entry in the cellAccessRelatedInfoList to the of the selected PLMN, acquire system information from the concerned cell regarding 5GC support;
      3> if the cell indicated by the cellForWhichToReportCGI included in the associated measObject is an E-UTRAN cell:
        4> try to acquire the CSG identity, if the CSG identity is broadcast in the concerned cell;
        4> try to acquire the trackingAreaCode in the concerned cell;
        4> try to acquire the trackingAreaCode in the concerned cell for 5GC;
        4> try to acquire the list of additional PLMN Identities, as included in the plmn-IdentityList, if multiple PLMN identities are broadcast in the concerned cell;

4> try to acquire the list of additional PLMN Identities, as included in the plmn-IdentityList-r15 if the cell supports 5GC, if multiple PLMN identities are broadcast in the concerned cell supporting 5GC;
4> if cellAccessRelatedInfoList is included, use trackingAreaCode and plmn-IdentityList from the entry of cellAccessRelatedInfoList containing the selected PLMN;
4> if cellAccessRelatedInfoList-r15 is included, use trackingAreaCode-5GC-r15 and plmn-IdentityList-r15 from the entry of cellAccessRelatedInfoList-r15 containing the selected PLMN for information related to 5GC for the configured cell;
NOTE 2: The 'primary' PLMN is part of the global cell identity. For cells supporting 5GC, there may be a different 'primary' PLMN indicated as the first element of the PLMN plmn-IdentityList-r15 from the entry of cellAccessRelatedInfoList-r15 containing the selected PLMN.
. . .
5.5.4 Measurement report triggering
5.5.4.1 General
If security has been activated successfully, the UE shall:
1> for each measId included in the measIdList within VarMeasConfig:
. . .
2> if the purpose is included and set to reportCGI and if the UE acquired the information needed to set all fields of cgi-Info for the requested cell:
3> include a measurement reporting entry within the VarMeasReportList for this measId;
3> set the numberOfReportsSent defined within the VarMeasReportList for this measId to 0;
3> stop timer T321;
3> initiate the measurement reporting procedure, as specified in 5.5.5;
. . .
5.5.5 Measurement reporting
5.5.5.1 General
For the measId for which the measurement reporting procedure was triggered, the UE shall set the measResults within the MeasurementReport message as follows:

1>set the measId to the measurement identity that triggered the measurement reporting;
. . .
1>if there is at least one applicable neighboring cell to report:
. . .
2>set the measResultNeighCells to include the best neighboring cells up to maxReportCells in accordance with the following:
. . .
3>else if the purpose is set to reportCGI:
4>if the mandatory present fields of the cgi-Info for the cell indicated by the cellForWhichToReportCGI in the associated measObject have been obtained:
. . .
5>else:
6>include the cgi-Info containing all the fields that have been successfully acquired and in accordance with the following:
7>include in the plmn-IdentityList the list of identities starting from the second entry of PLMN Identities in the broadcast information;

-continued

7>include in the plmn-IdentityList-5GC the list of identities starting from the second entry of PLMN Identities in the broadcast information associated to 5GC; ...

In another embodiment, the CGI reporting structure for LTE cells connected to 5GC (or any cell connected to 5GC) is defined such a way that a primary PLMN does not need to be defined. In such embodiments, the CGI-related information reported by the UE is an element of the cellAccessRelatedInfoList-5GC-r15 broadcast in SIB1 (e.g., as illustrated in FIG. 6), including the selected PLMN for the UE configured to report CGI. In this embodiment, upon receiving the SIB1 containing such information, the UE does not need to create a CGI for reporting, and instead reports the information necessary for the network to determine the CGI. For example, the UE can report a cgi-Info-5gc-rel15 (e.g., in MeasResultEUTRA) containing one or more CellAccessRelatedInfo-5GC-r15 elements.

An exemplary ASN.1 data structure in which cgi-Info-5gc-rel15 contains a single CellAccessRelatedInfo-5GC-r15 element is shown in FIG. 8C. As another alternative, the UE can report a cgi-Info-5gc-rel15 containing multiple (e.g., a sequence of) CellAccessRelatedInfo-5GC-r15 elements, each corresponding to a particular element of the cellAccessRelatedInfoList-5GC-r15 broadcast in SIB1.

These embodiments described above can be further illustrated with reference to FIGS. 9-10, which depict exemplary methods and/or procedures performed by a network node and a UE, respectively. Put differently, various features of the operations described below correspond to various embodiments described above.

Figure 9:
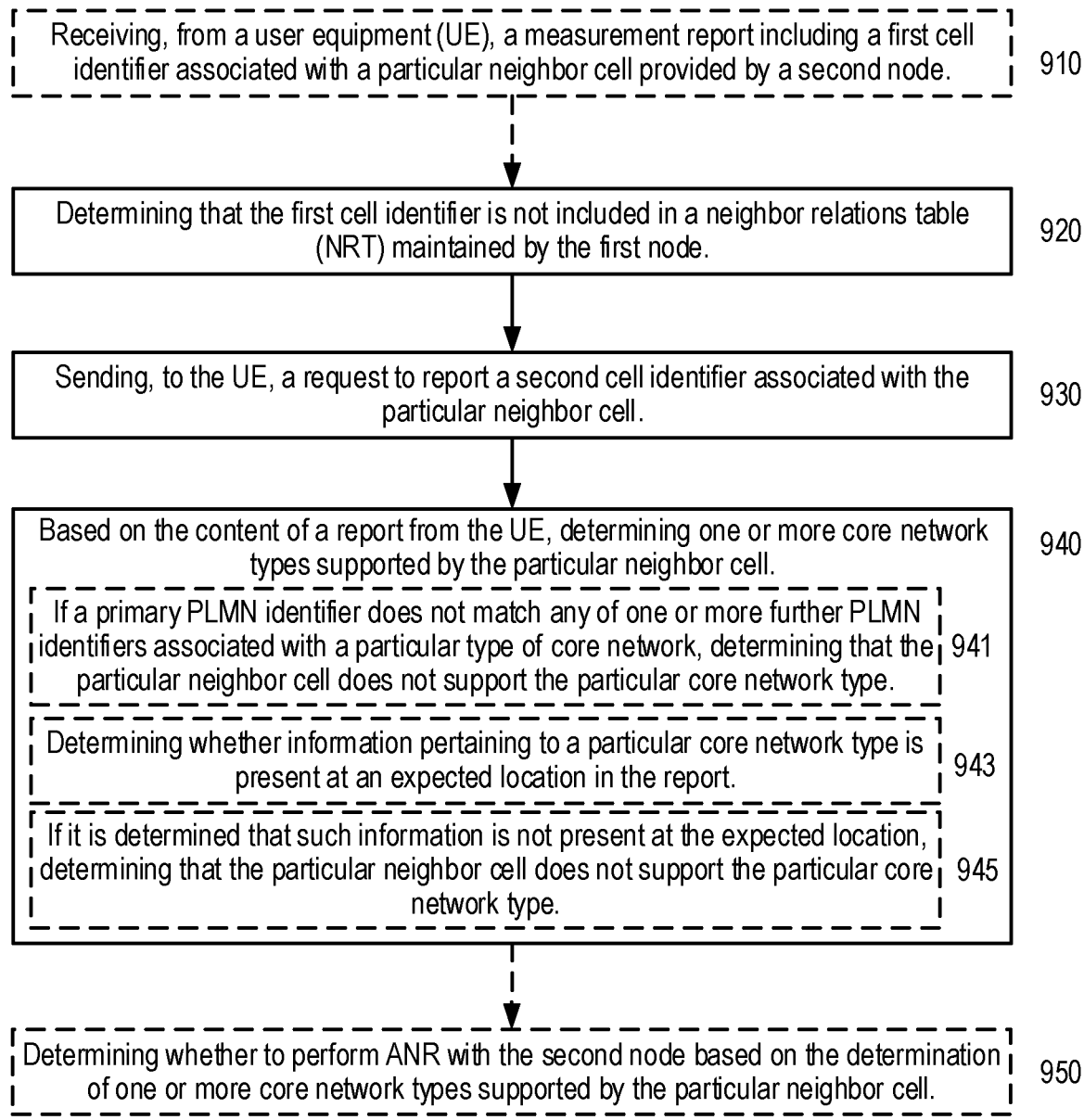
FIG. 9 is a flow diagram illustrating exemplary methods and/or procedures performed by a first node configured to provide a serving cell to a UE in a radio access network (RAN), according to various exemplary embodiments of the present disclosure.

More specifically, FIG. 9 is a flow diagram illustrating an exemplary method and/or procedure for a first node, configured to provide a serving cell to a user equipment (UE) in a radio access network (RAN), to determine core network types supported by a second node configured to provide one or more neighbor cells of the serving cell, according to various exemplary embodiments of the present disclosure. The exemplary method and/or procedure shown in FIG. 9 can be implemented, for example, by a network node (e.g., eNB, gNB, ng-eNB, or components thereof) such as shown in, or described in relation to, other FIGS. herein. For example, the exemplary method and/or procedure can be used for Automatic Neighbor Relations (ANR) between the first node and the second node.

Furthermore, as explained below, the exemplary method and/or procedure shown in FIG. 9 can be utilized cooperatively with other exemplary methods and/or procedures described herein (e.g., FIG. 10) to provide various exemplary benefits described herein. Although FIG. 9 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

In some embodiments, the exemplary method and/or procedure illustrated in FIG. 9 can include the operations of block 910, in which the first node can receive, from the UE, a measurement report including a first cell identifier associated with a particular one of the neighbor cells. In some embodiments, the first cell identifier can be a physical cell identifier (PCI). The exemplary method and/or procedure can also include the operations of block 920, in which the first node can determine that the first cell identifier (e.g., received in block 910) is not included in a neighbor relations table (NRT) maintained by the first node.

The exemplary method and/or procedure can also include the operations of block 930, in which the first node can send, to the UE, a request to report a second cell identifier associated with the particular neighbor cell. The request can include the first cell identifier associated with the particular neighbor cell. In some embodiments, the second cell identifier can be a cell global identifier (CGI). The exemplary method and/or procedure can also include the operations of block 940, in which based on the content of a report from the UE (e.g., in response to the request sent in block 930), the first node can determine one or more core network types supported by the particular neighbor cell.

In some embodiments, the one or more types of core networks can be determined in block 940 from a plurality of core network types, including a first core network type and a second core network type. In such embodiments, the first core network type can be one of an Evolved Packet Core (EPC) and a 5G Core (5GC), and the second core network type can be the other of the EPC and the 5GC.

In some embodiments, the report can indicate that the particular neighbor cell supports the first core network type, and the report can include cell-access-related information for the particular neighbor cell with respect to the first core network type. In such embodiments, the cell-access-related information for the particular neighbor cell with respect to the first core network type can include the following: a tracking area code (TAC), the first cell identifier, and information identifying one or more public land mobile networks (PLMNs). In various embodiments, the information identifying one or more PLMNs can include a list of one or more PLMN identities, or a list of one or more PLMN indices, each PLMN index corresponding to a position in a list of PLMN identities.

In some embodiments, the particular neighbor cell can be associated with a plurality of public land mobile networks (PLMNs). In such embodiments, the report can include the cell-access-related information for the plurality of PLMNs with respect to the first core network type (e.g., 5GC or EPC). Furthermore, in such embodiments, the report from the UE does not include the second cell identifier (e.g., CGI) of the particular neighbor cell with respect to the first core network type. In other words, the report can include the cell-access-related information but not the second cell identifier.

In some embodiments, the report from the UE can also indicate that the particular neighbor cell supports the second core network type (e.g., EPC or 5GC). In such case, the report can also include the second cell identifier (e.g., CGI) with respect to the second core network type.

In some embodiments, the report from the UE can include a primary public land mobile network (PLMN) identifier associated with the particular neighbor cell. In such embodiments, the operations of block 940 can include the operations of sub-block 941, in which the network node can determine that the particular neighbor cell does not support a particular core network type if the primary PLMN identifier does not match any of one or more further PLMN identifiers associated with the particular core network type.

In some embodiments, the report from the UE can include a tracking area code (TAC) associated with the particular neighbor cell. In such embodiments, the network node can determine the one or more types of core network supported by the particular neighbor cell (i.e., in operation 940) based on the length of the TAC associated with the particular neighbor cell.

In some embodiments, the operations of block 940 can include the operations of sub-block 943, in which the network node can determine whether information pertaining to a particular core network type is present at an expected location in the report from the UE. In such embodiments, the operations of block 940 can also include the operations of sub-block 945, where if it is determined that such information is not present at the expected location, the network node can determine that the particular neighbor cell does not support the particular core network type.

In some embodiments, the exemplary method and/or procedure can also include the operations of block 950, in which the first node can determine whether to perform ANR with the second node based on the determination of one or more core network types of supported by the particular neighbor cell. In some embodiments, the determination in block 950 can also be based on the capabilities of the UE.

Figure 10:
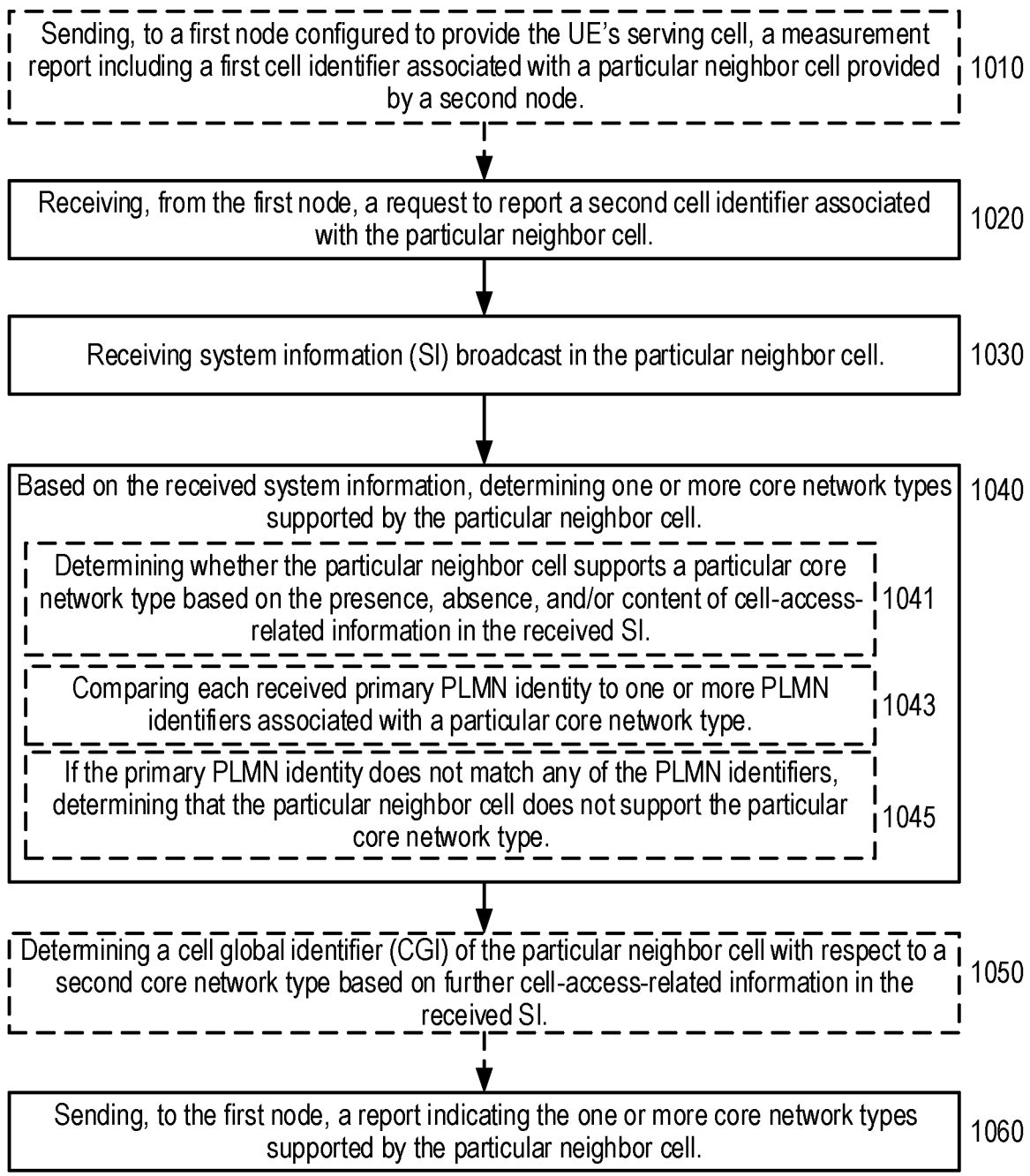
FIG. 10 is a flow diagram illustrating exemplary methods and/or procedures performed by a UE, according to various exemplary embodiments of the present disclosure.

Similarly, FIG. 10 is a flow diagram illustrating an exemplary method and/or procedure performed by a user equipment (UE, e.g., wireless device, IoT device, MTC device, etc. or component(s) thereof), according to various exemplary embodiments of the present disclosure. For example, the exemplary method and/or procedure can be used in support of Automatic Neighbor Relations (ANR) between a first node and a second node in a radio access network (RAN). Furthermore, the exemplary method and/or procedure shown in FIG. 10 can be utilized cooperatively with other exemplary methods and/or procedures described herein (e.g., FIG. 9) to provide various exemplary benefits described herein. Although FIG. 10 shows blocks in a particular order, this order is merely exemplary and the operations of the exemplary method and/or procedure can be performed in a different order than shown, and can be combined and/or divided into blocks having different functionality than shown. Optional operations are indicated by dashed lines.

The exemplary method and/or procedure illustrated in FIG. 10 can include the operations of block 1010, in which the UE can send, to first node configured to provide the UE's serving cell in the RAN, a measurement report including a first cell identifier associated with a neighbor cell provided by a second node in the RAN. In some embodiments, the first cell identifier can be a physical cell identifier (PCI). This operation can correspond to the first node receiving the measurement report, such as in operation 910 described above.

The exemplary method and/or procedure can also include the operations of block 1020, in which the UE can receive, from the first node, a request to report a second cell identifier associated with the neighbor cell. The request can include the first cell identifier associated with the neighbor cell. In some embodiments, the second cell identifier can be a cell global identifier (CGI). This operation can correspond to the first node transmitting the request, such as in operation 930 described above.

The exemplary method and/or procedure can also include the operations of block 1030, in which the UE can receive system information (SI) broadcast in the particular neighbor cell. For example, the system information can be cell-specific SI broadcast by the second node.

The exemplary method and/or procedure can also include the operations of block 1040, in which the UE can, based on the received system information, determine one or more core network types supported by the particular neighbor cell.

Determining the one of more core network types in operation 940, described above, can be based on this report. The exemplary method and/or procedure can also include the operations of block 1060, in which the UE can send, to the first node, a report indicating the one or more types of core network supported by the particular neighbor cell.

In some embodiments, the one or more types of core networks can be determined in block 1040 from a plurality of core network types, including a first core network type and a second core network type. In such embodiments, the first core network type can be one of an Evolved Packet Core (EPC) and a 5G Core (5GC), and the second core network type can be the other of the EPC and the 5GC.

In some embodiments, the received system information can include cell-access-related information for the particular neighbor cell with respect to the first core network type. In such embodiments, the report can indicate that the particular neighbor cell supports the first core network type, and the report can include the cell-access-related information with respect to the first core network type (e.g., the cell-access-related information received in system information).

In such embodiments, the cell-access-related information for the particular neighbor cell with respect to the first core network type can include the following: a tracking area code (TAC), the first cell identifier, and information identifying one or more public land mobile networks (PLMNs). Furthermore, the information identifying one or more PLMNs can include a list of one or more PLMN identities, or a list of one or more PLMN indices, each PLMN index corresponding to a position in a list of PLMN identities.

In some embodiments, the particular neighbor cell can be associated with a plurality of public land mobile networks (PLMNs). In such embodiments, the received system information can include cell-access-related information for the plurality of PLMNs with respect to the first core network type. Furthermore, in such embodiments, the report can include the cell-access-related information (e.g., received in system information) for the plurality of PLMNs with respect to the first core network type of (e.g., 5GC or EPC). In some variants, such as when the second cell identifier is a cell global identifier (CGI), the report does not include the CGI of the particular neighbor cell with respect to the first core network type. In other words, the report can include the cell-access-related information but not the second cell identifier (e.g., CGI).

In some embodiments, the received system information can include further cell-access-related information, for the particular neighbor cell, with respect to the second core network type (e.g., EPC or 5GC). In such embodiments, the exemplary method and/or procedure can also include the operations of block 1050, where the UE can determine the CGI of the particular neighbor cell with respect to the second core network type based on the further cell-access-related information. In such embodiments, the report (i.e., in block 1050) can also include the determined CGI with respect to the second core network type.

In some embodiments, if it is determined that the neighbor cell does not support a particular core network type, the report does not include information about support for the particular core network type. For example, the lack of such information in the report can indicate, to the first node, that the neighbor cell does not support the particular core network type.

In some embodiments, the operations of block 1040 can include the operations of sub-block 1041, where the UE can determine whether the particular neighbor cell supports a particular core network type based on one of the following: the presence or absence, in the received system information, of cell-access-related information associated with the particular core network type; and if present, the content of the cell-access-related information.

In some embodiments, the received system information can include respective barring indicators related to each of a plurality of core network types. In such embodiments, the UE can determine (i.e., in operation 1040) the one or more types of core networks supported by the particular neighbor cell based on the values of the respective barring indicators.

In some embodiments, the received system information can include a primary public land mobile network (PLMN) identity pertaining to at least one core network type. In such embodiments, the operations of block 1040 can include the operations of sub-block 1043, where the UE can compare each primary PLMN identity to one or more PLMN identifiers associated with a particular core network type. In such embodiments, the operations of block 1040 can also include the operations of sub-block 1045, where the UE can determine that the particular neighbor cell does not support the particular core network type if the primary PLMN identity does not match any of the PLMN identifiers.

Figure 11:
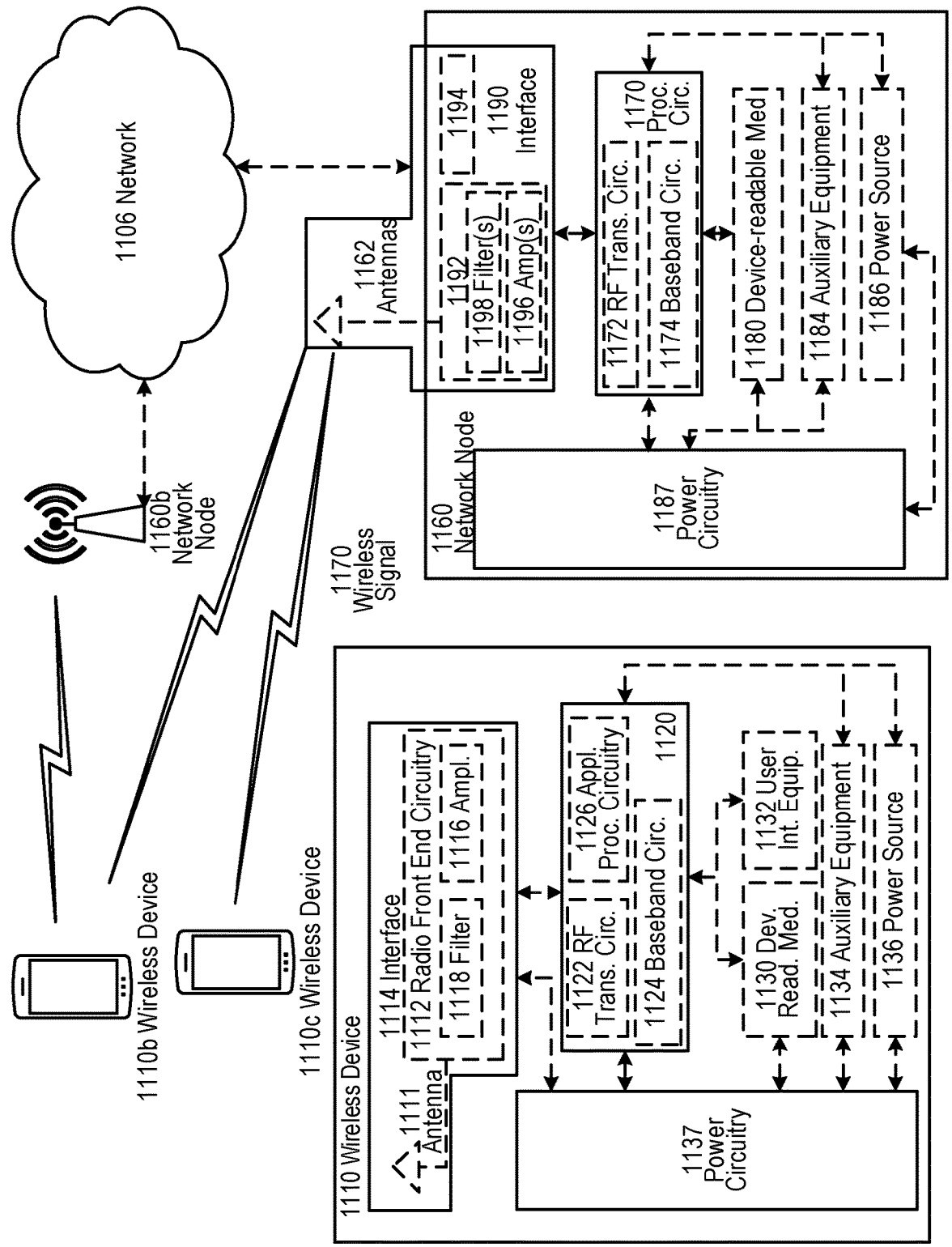
FIG. 11 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 11. For simplicity, the wireless network of FIG. 11 only depicts network 1106, network nodes 1160 and 1160b, and WDs 1110, 1110b, and 1110c. In practice, a wireless network can further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points) and base stations (BS, e.g., radio base stations, NBs, eNBs, and gNBs). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below.

In FIG. 11, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 11 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1160 are depicted as single boxes located within a larger box, or nested within multiple boxes, in practice, a network node can comprise multiple different physical components that make up a single illustrated component (e.g., device readable medium 1180 can comprise multiple separate hard drives as well as multiple RAM modules).

Similarly, network node 1160 can be composed of multiple physically separate components (e.g., a NodeB component and a RNC component, or a BTS component and a BSC component, etc.), which can each have their own respective components. In certain scenarios in which network node 1160 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1160 can be configured to support multiple radio access technologies (RATs). In such embodiments, some components can be duplicated (e.g., separate device readable medium 1180 for the different RATs) and some components can be reused (e.g., the same antenna 1162 can be shared by the RATs). Network node 1160 can also include multiple sets of the various illustrated components for different wireless technologies integrated into network node 1160, such as, for example, GSM, WCDMA, LTE, NR, WiFi, or Bluetooth wireless technologies. These wireless technologies can be integrated into the same or different chip or set of chips and other components within network node 1160.

Processing circuitry 1170 can be configured to perform any determining, calculating, or similar operations (e.g., certain obtaining operations) described herein as being provided by a network node. These operations performed by processing circuitry 1170 can include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 can execute instructions stored in device readable medium 1180 or in memory within processing circuitry 1170. Such functionality can include providing any of the various wireless features, functions, or benefits discussed herein. In some embodiments, processing circuitry 1170 can include a system on a chip (SOC).

In some embodiments, processing circuitry 1170 can include one or more of radio frequency (RF) transceiver circuitry 1172 and baseband processing circuitry 1174. In some embodiments, radio frequency (RF) transceiver circuitry 1172 and baseband processing circuitry 1174 can be on separate chips (or sets of chips), boards, or units, such as radio units and digital units. In alternative embodiments, part or all of RF transceiver circuitry 1172 and baseband processing circuitry 1174 can be on the same chip or set of chips, boards, or units In certain embodiments, some or all of the functionality described herein as being provided by a network node, base station, eNB or other such network device can be performed by processing circuitry 1170 executing instructions stored on device readable medium 1180 or memory within processing circuitry 1170. In alternative embodiments, some or all of the functionality can be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1170. Device readable medium 1180 can store any suitable instructions, data or information, including a computer program, software, an application including one or more of logic, rules, code, tables, etc. and/or other instructions capable of being executed by processing circuitry 1170 and, utilized by network node 1160. Device readable medium 1180 can be used to store any calculations made by processing circuitry 1170 and/or any data received via interface 1190. In some embodiments, processing circuitry 1170 and device readable medium 1180 can be considered to be integrated.

Interface 1190 is used in the wired or wireless communication of signalling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that can be coupled to, or in certain embodiments a part of, antenna 1162. Radio front end circuitry 1192 comprises filters 1198 and amplifiers 1196. Radio front end circuitry 1192 can be connected to antenna 1162 and processing circuitry 1170. Radio front end circuitry can be configured to condition signals communicated between antenna 1162 and processing circuitry 1170. Radio front end circuitry 1192 can receive digital data that is to be sent out to other network nodes or WDs via a wireless connection. Radio front end circuitry 1192 can convert the digital data into a radio signal having the appropriate channel and bandwidth parameters using a combination of filters 1198 and/or amplifiers 1196. The radio signal can then be transmitted via antenna 1162. Similarly, when receiving data, antenna 1162 can collect radio signals which are then converted into digital data by radio front end circuitry 1192. The digital data can be passed to processing circuitry 1170. In other embodiments, the interface can comprise different components and/or different combinations of components.

In certain alternative embodiments, network node 1160 may not include separate radio front end circuitry 1192, instead, processing circuitry 1170 can comprise radio front end circuitry and can be connected to antenna 1162 without separate radio front end circuitry 1192. Similarly, in some embodiments, all or some of RF transceiver circuitry 1172 can be considered a part of interface 1190. In still other embodiments, interface 1190 can include one or more ports or terminals 1194, radio front end circuitry 1192, and RF transceiver circuitry 1172, as part of a radio unit (not shown), and interface 1190 can communicate with baseband processing circuitry 1174, which is part of a digital unit (not shown).

Antenna 1162 can include one or more antennas, or antenna arrays, configured to send and/or receive wireless signals. Antenna 1162 can be coupled to radio front end circuitry 1190 and can be any type of antenna capable of transmitting and receiving data and/or signals wirelessly. In some embodiments, antenna 1162 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1162 can be separate from network node 1160 and can be connectable to network node 1160 through an interface or port.

Antenna 1162, interface 1190, and/or processing circuitry 1170 can be configured to perform any receiving operations and/or certain obtaining operations described herein as being performed by a network node. Any information, data and/or signals can be received from a wireless device, another network node and/or any other network equipment. Similarly, antenna 1162, interface 1190, and/or processing circuitry 1170 can be configured to perform any transmitting operations described herein as being performed by a network node. Any information, data and/or signals can be transmitted to a wireless device, another network node and/or any other network equipment.

Power circuitry 1187 can comprise, or be coupled to, power management circuitry and can be configured to supply the components of network node 1160 with power for performing the functionality described herein. Power circuitry 1187 can receive power from power source 1186. Power source 1186 and/or power circuitry 1187 can be configured to provide power to the various components of network node 1160 in a form suitable for the respective components (e.g., at a voltage and current level needed for each respective component). Power source 1186 can either be included in, or external to, power circuitry 1187 and/or network node 1160. For example, network node 1160 can be connectable to an external power source (e.g., an electricity outlet) via an input circuitry or interface such as an electrical cable, whereby the external power source supplies power to power circuitry 1187. As a further example, power source 1186 can comprise a source of power in the form of a battery or battery pack which is connected to, or integrated in, power circuitry 1187. The battery can provide backup power should the external power source fail. Other types of power sources, such as photovoltaic devices, can also be used.

Alternative embodiments of network node 1160 can include additional components beyond those shown in FIG. 11 that can be responsible for providing certain aspects of the network node's functionality, including any of the functionality described herein and/or any functionality necessary to support the subject matter described herein. For example, network node 1160 can include user interface equipment to allow and/or facilitate input of information into network node 1160 and to allow and/or facilitate output of information from network node 1160. This can allow and/or facilitate a user to perform diagnostic, maintenance, repair, and other administrative functions for network node 1160.

In some embodiments, a wireless device (WD, e.g., WD 1110) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 can include multiple sets of one or more of the illustrated components for different wireless technologies supported by WD 1110, such as, for example, GSM, WCDMA, LTE, NR, WiFi, WiMAX, or Bluetooth wireless technologies, just to mention a few. These wireless technologies can be integrated into the same or different chips or set of chips as other components within WD 1110.

Antenna 1111 can include one or more antennas or antenna arrays, configured to send and/or receive wireless signals, and is connected to interface 1114. In certain alternative embodiments, antenna 1111 can be separate from WD 1110 and be connectable to WD 1110 through an interface or port. Antenna 1111, interface 1114, and/or processing circuitry 1120 can be configured to perform any receiving or transmitting operations described herein as being performed by a WD. Any information, data and/or signals can be received from a network node and/or another WD. In some embodiments, radio front end circuitry and/or antenna 1111 can be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and can be configured to condition signals communicated between antenna 1111 and processing circuitry 1120. Radio front end circuitry 1112 can be coupled to or a part of antenna 1111. In some embodiments, WD 1110 may not include separate radio front end circuitry 1112; rather, processing circuitry 1120 can comprise radio front end circuitry and can be connected to antenna 1111. Similarly, in some embodiments, some or all of RF transceiver circuitry 1122 can be considered a part of interface 1114. Radio front end circuitry 1112 can receive digital data that is to be sent out to other network nodes or WDs via a wireless connection. Radio front end circuitry 1112 can convert the digital data into a radio signal having the appropriate channel and bandwidth parameters using a combination of filters 1118 and/or amplifiers 1116. The radio signal can then be transmitted via antenna 1111. Similarly, when receiving data, antenna 1111 can collect radio signals which are then converted into digital data by radio front end circuitry 1112. The digital data can be passed to processing circuitry 1120. In other embodiments, the interface can comprise different components and/or different combinations of components.

Processing circuitry 1120 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality can include providing any of the various wireless features or benefits discussed herein. For example, processing circuitry 1120 can execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry can comprise different components and/or different combinations of components. In certain embodiments processing circuitry 1120 of WD 1110 can comprise a SOC. In some embodiments, RF transceiver circuitry 1122, baseband processing circuitry 1124, and application processing circuitry 1126 can be on separate chips or sets of chips. In alternative embodiments, part or all of baseband processing to circuitry 1124 and application processing circuitry 1126 can be combined into one chip or set of chips, and RF transceiver circuitry 1122 can be on a separate chip or set of chips. In still alternative embodiments, part or all of RF transceiver circuitry 1122 and baseband processing circuitry 1124 can be on the same chip or set of chips, and application processing circuitry 1126 can be on a separate chip or set of chips. In yet other alternative embodiments, part or all of RF transceiver circuitry 1122, baseband processing circuitry 1124, and application processing circuitry 1126 can be combined in the same chip or set of chips. In some embodiments, RF transceiver circuitry 1122 can be a part of interface 1114. RF transceiver circuitry 1122 can condition RF signals for processing circuitry 1120.

In certain embodiments, some or all of the functionality described herein as being performed by a WD can be provided by processing circuitry 1120 executing instructions stored on device readable medium 1130, which in certain embodiments can be a computer-readable storage medium. In alternative embodiments, some or all of the functionality can be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 can be configured to perform any determining, calculating, or similar operations (e.g., certain obtaining operations) described herein as being performed by a WD. These operations, as performed by processing circuitry 1120, can include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 can be operable to store a computer program, software, an application including one or more of logic, rules, code, tables, etc. and/or other instructions capable of being executed by processing circuitry 1120. Device readable medium 1130 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1120. In some embodiments, processing circuitry 1120 and device readable medium 1130 can be considered to be integrated.

User interface equipment 1132 can include components that allow and/or facilitate a human user to interact with WD 1110. Such interaction can be of many forms, such as visual, audial, tactile, etc. User interface equipment 1132 can be operable to produce output to the user and to allow and/or facilitate the user to provide input to WD 1110. The type of interaction can vary depending on the type of user interface equipment 1132 installed in WD 1110. For example, if WD 1110 is a smart phone, the interaction can be via a touch screen; if WD 1110 is a smart meter, the interaction can be through a screen that provides usage (e.g., the number of gallons used) or a speaker that provides an audible alert (e.g., if smoke is detected). User interface equipment 1132 can include input interfaces, devices and circuits, and output interfaces, devices and circuits. User interface equipment 1132 can be configured to allow and/or facilitate input of information into WD 1110, and is connected to processing circuitry 1120 to allow and/or facilitate processing circuitry 1120 to process the input information. User interface equipment 1132 can include, for example, a microphone, a proximity or other sensor, keys/buttons, a touch display, one or more cameras, a USB port, or other input circuitry. User interface equipment 1132 is also configured to allow and/or facilitate output of information from WD 1110, and to allow and/or facilitate processing circuitry 1120 to output information from WD 1110. User interface equipment 1132 can include, for example, a speaker, a display, vibrating circuitry, a USB port, a headphone interface, or other output circuitry. Using one or more input and output interfaces, devices, and circuits, of user interface equipment 1132, WD 1110 can communicate with end users and/or the wireless network, and allow and/or facilitate them to benefit from the functionality described herein.

Auxiliary equipment 1134 is operable to provide more specific functionality which may not be generally performed by WDs. This can comprise specialized sensors for doing measurements for various purposes, interfaces for additional types of communication such as wired communications etc. The inclusion and type of components of auxiliary equipment 1134 can vary depending on the embodiment and/or scenario.

Power source 1136 can, in some embodiments, be in the form of a battery or battery pack. Other types of power sources, such as an external power source (e.g., an electricity outlet), photovoltaic devices or power cells, can also be used. WD 1110 can further comprise power circuitry 1137 for delivering power from power source 1136 to the various parts of WD 1110 which need power from power source 1136 to carry out any functionality described or indicated herein. Power circuitry 1137 can in certain embodiments comprise power management circuitry. Power circuitry 1137 can additionally or alternatively be operable to receive power from an external power source; in which case WD 1110 can be connectable to the external power source (such as an electricity outlet) via input circuitry or an interface such as an electrical power cable. Power circuitry 1137 can also in certain embodiments be operable to deliver power from an external power source to power source 1136. This can be, for example, for the charging of power source 1136. Power circuitry 1137 can perform any converting or other modification to the power from power source 1136 to make it suitable for supply to the respective components of WD 1110.

Figure 12:
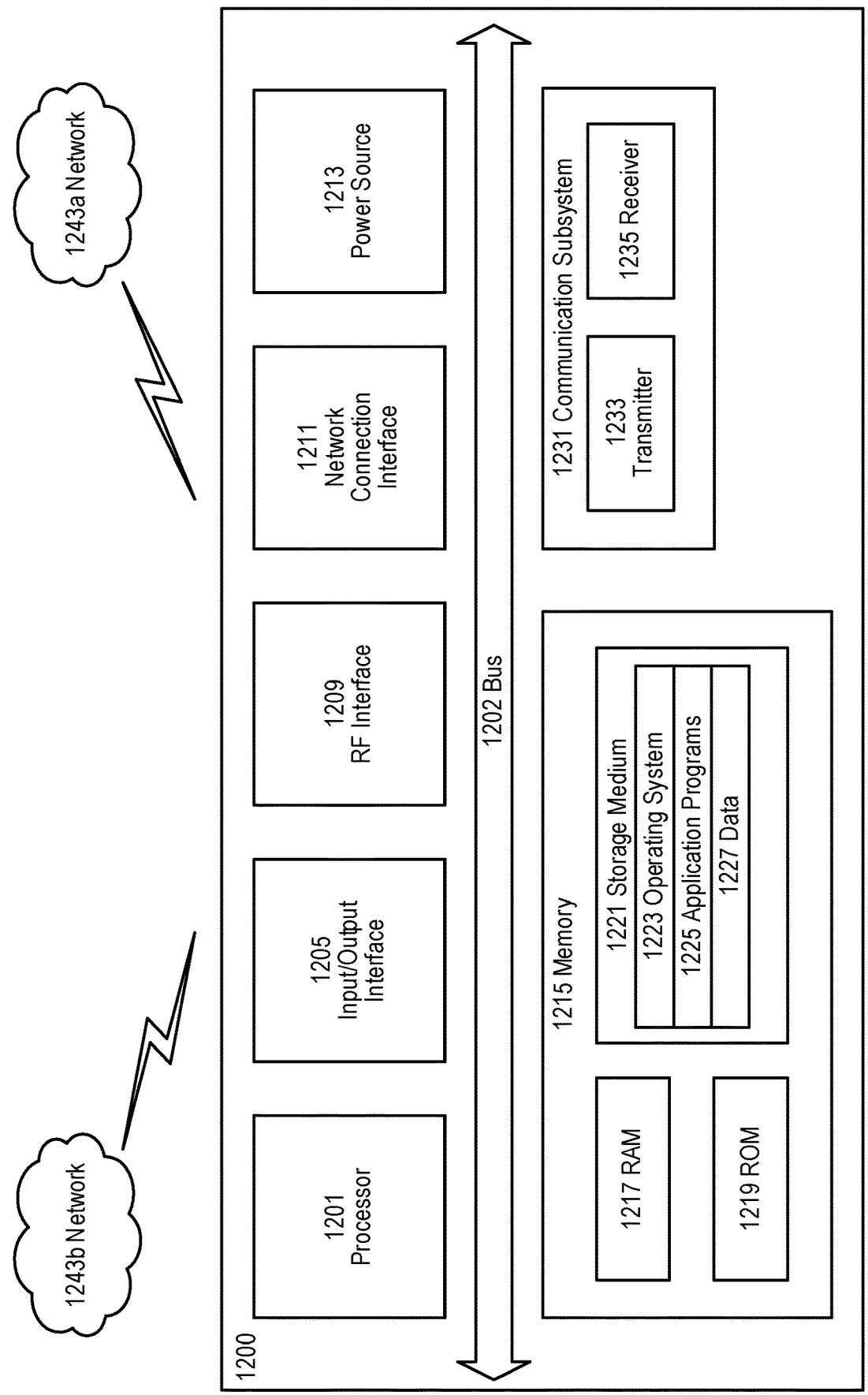
FIG. 12 illustrates an exemplary embodiment of a UE, in accordance with various aspects described herein.

FIG. 12 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1200 can be any UE identified by the $3^{rd}$ Generation Partnership Project (3GPP), including a NB-IoT UE, a machine type communication (MTC) UE, and/or an enhanced MTC (eMTC) UE. UE 1200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE can be used interchangeable. Accordingly, although FIG. 12 is a UE, the components discussed herein are equally applicable to a WD, and vice-versa.

In FIG. 12, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 can include other similar types of information. Certain UEs can utilize all of the components shown in FIG. 12, or only a subset of the components. The level of integration between the components can vary from one UE to another UE. Further, certain UEs can contain multiple instances of a component, such as multiple processors, memories, transceivers, transmitters, receivers, etc.

In FIG. 12, processing circuitry 1201 can be configured to process computer instructions and data. Processing circuitry 1201 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 can include two central processing units (CPUs). Data can be information in a form suitable for use by a computer.

In the depicted embodiment, input/output interface 1205 can be configured to provide a communication interface to an input device, output device, or input and output device. UE 1200 can be configured to use an output device via input/output interface 1205. An output device can use the same type of interface port as an input device. For example, a USB port can be used to provide input to and output from UE 1200. The output device can be a speaker, a sound card, a video card, a display, a monitor, a printer, an actuator, an emitter, a smartcard, another output device, or any combination thereof. UE 1200 can be configured to use an input device via input/output interface 1205 to allow and/or facilitate a user to capture information into UE 1200. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 12, RF interface 1209 can be configured to provide a communication interface to RF components such as a transmitter, a receiver, and an antenna. Network connection interface 1211 can be configured to provide a communication interface to network 1243a. Network 1243a can encompass wired and/or wireless networks such as a local-area network (LAN), a wide-area network (WAN), a computer network, a wireless network, a telecommunications network, another like network or any combination thereof. For example, network 1243a can comprise a Wi-Fi network. Network connection interface 1211 can be configured to include a receiver and a transmitter interface used to communicate with one or more other devices over a communication network according to one or more communication protocols, such as Ethernet, TCP/IP, SONET, ATM, or the like. Network connection interface 1211 can implement receiver and transmitter functionality appropriate to the communication network links (e.g., optical, electrical, and the like). The transmitter and receiver functions can share circuit components, software or firmware, or alternatively can be implemented separately.

RAM 1217 can be configured to interface via bus 1202 to processing circuitry 1201 to provide storage or caching of data or computer instructions during the execution of software programs such as the operating system, application programs, and device drivers. ROM 1219 can be configured to provide computer instructions or data to processing circuitry 1201. For example, ROM 1219 can be configured to store invariant low-level system code or data for basic system functions such as basic input and output (I/O), startup, or reception of keystrokes from a keyboard that are stored in a non-volatile memory. Storage medium 1221 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 can be configured to include operating system 1223, application program 1225 such as a web browser application, a widget or gadget engine or another application, and data file 1227. Storage medium 1221 can store, for use by UE 1200, any of a variety of various operating systems or combinations of operating systems.

Storage medium 1221 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 can allow and/or facilitate UE 1200 to access computer-executable instructions, application programs or the like, stored on transitory or non-transitory memory media, to off-load data, or to upload data. An article of manufacture, such as one utilizing a communication system can be tangibly embodied in storage medium 1221, which can comprise a device readable medium.

In FIG. 12, processing circuitry 1201 can be configured to communicate with network 1243b using communication subsystem 1231. Network 1243a and network 1243b can be the same network or networks or different network or networks. Communication subsystem 1231 can be configured to include one or more transceivers used to communicate with network 1243b. For example, communication subsystem 1231 can be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver can include transmitter 1233 and/or receiver 1235 to implement transmitter or receiver functionality, respectively, appropriate to the RAN links (e.g., frequency allocations and the like). Further, transmitter 1233 and receiver 1235 of each transceiver can share circuit components, software or firmware, or alternatively can be implemented separately.

In the illustrated embodiment, the communication functions of communication subsystem 1231 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 can include cellular communication, Wi-Fi communication, Bluetooth communication, and GPS communication. Network 1243b can encompass wired and/or wireless networks such as a local-area network (LAN), a wide-area network (WAN), a computer network, a wireless network, a telecommunications network, another like network or any combination thereof. For example, network 1243*b* can be a cellular network, a Wi-Fi network, and/or a near-field network. Power source 1213 can be configured to provide alternating current (AC) or direct current (DC) power to components of UE 1200.

The features, benefits and/or functions described herein can be implemented in one of the components of UE 1200 or partitioned across multiple components of UE 1200. Further, the features, benefits, and/or functions described herein can be implemented in any combination of hardware, software or firmware. In one example, communication subsystem ix) 1231 can be configured to include any of the components described herein. Further, processing circuitry 1201 can be configured to communicate with any of such components over bus 1202. In another example, any of such components can be represented by program instructions stored in memory that when executed by processing circuitry 1201 perform the corresponding functions described herein. In another example, the functionality of any of such components can be partitioned between processing circuitry 1201 and communication subsystem 1231. In another example, the non-computationally intensive functions of any of such components can be implemented in software or firmware and the computationally intensive functions can be implemented in hardware.

Figure 13:
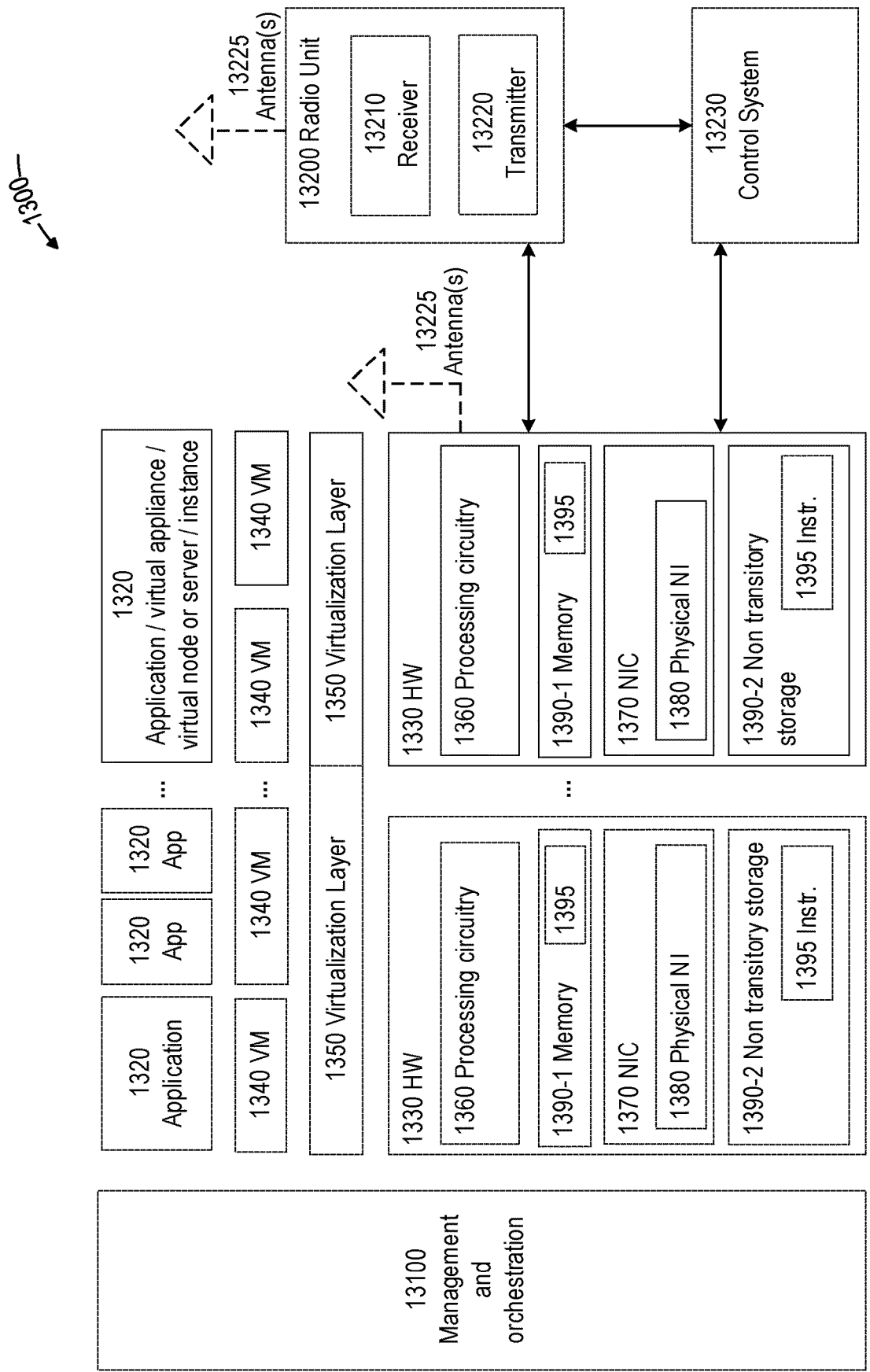
FIG. 13 is a block diagram illustrating an exemplary virtualization environment usable for implementation of various embodiments of network nodes described herein.

FIG. 13 is a schematic block diagram illustrating a virtualization environment 1300 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station, a virtualized radio access node, virtualized core network node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node can be entirely virtualized.

The functions can be implemented by one or more applications 1320 (which can alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which can be commercial off-the-shelf (COTS) processors, dedicated Application Specific Integrated Circuits (ASICs), or any other type of processing circuitry including digital or analog hardware components or special purpose processors. Each hardware device can comprise memory 1390-1 which can be non-persistent memory for temporarily storing instructions 1395 or software executed by processing circuitry 1360. Each hardware device can comprise one or more network interface controllers (NICs) 1370, also known as network interface cards, which include physical network interface 1380. Each hardware device can also include non-transitory, persistent, machine-readable storage media 1390-2 having stored therein software 1395 and/or instructions executable by processing circuitry 1360. Software 1395 can include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and can be run by a corresponding virtualization layer 1350 or hypervisor. Different embodiments of the instance of virtual appliance 1320 can be implemented on one or more of virtual machines 1340, and the implementations can be made in different ways.

During operation, processing circuitry 1360 executes software 1395 to instantiate the hypervisor or virtualization layer 1350, which can sometimes be referred to as a virtual machine monitor (VMM). Virtualization layer 1350 can present a virtual operating platform that appears like networking hardware to virtual machine 1340.

As shown in FIG. 13, hardware 1330 can be a standalone network node with generic or specific components. Hardware 1330 can comprise antenna 13225 and can implement some functions via virtualization. Alternatively, hardware 1330 can be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1340 can be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

In the context of NFV, Virtual Network Function (VNF) is responsible for handling specific network functions that run in one or more virtual machines 1340 on top of hardware networking infrastructure 1330, and can correspond to application 1320 in FIG. 13.

In some embodiments, one or more radio units 13200 that each include one or more transmitters 13220 and one or more receivers 13210 can be coupled to one or more antennas 13225. Radio units 13200 can communicate directly with hardware nodes 1330 via one or more appropriate network interfaces and can be used in combination with the virtual components to provide a virtual node with radio capabilities, such as a radio access node or a base station.

In some embodiments, some signalling can be affected with the use of control system 13230 which can alternatively be used for communication between the hardware nodes 1330 and radio units 13200.

Figure 14:
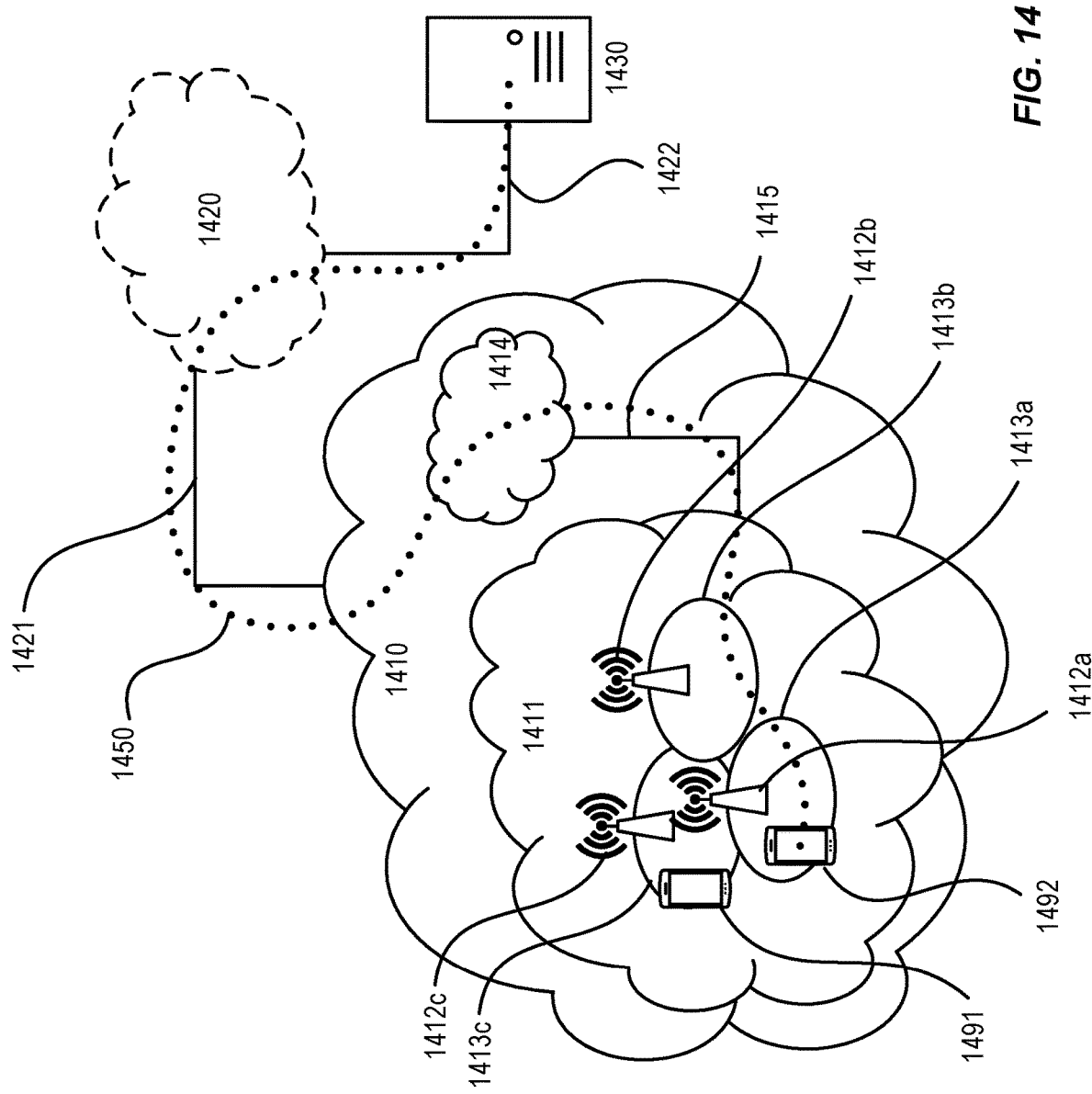
FIGS. 14-15 are block diagrams of various exemplary communication systems and/or networks, in accordance with various aspects described herein.

With reference to FIG. 14, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c can be configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the Telecommunication network 1410 is itself connected to host computer 1430, which can be embodied in the hardware and/or software of a standalone server, a cloud-implemented server, a distributed server or as processing resources in a server farm. Host computer 1430 can be under the ownership or control of a service provider, or can be operated by the service provider or on behalf of the service provider. Connections 1421 and 1422 between telecommunication network 1410 and host computer 1430 can extend directly from core network 1414 to host computer 1430 or can go via an optional intermediate network 1420. Intermediate network 1420 can be one of, or a combination of more than one of, a public, private or hosted network; intermediate network 1420, if any, can be a backbone network or the Internet; in particular, intermediate network 1420 can comprise two or more sub-networks (not shown).

The communication system of FIG. 14 as a whole enables connectivity between the connected UEs 1491, 1492 and host computer 1430. The connectivity can be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 can be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Example implementations, in accordance with an embodiment, of the UE, base station and host computer discussed in the preceding paragraphs will now be described with reference to FIG. 15. In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which can have storage and/or processing capabilities. In particular, processing circuitry 1518 can comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 can be operable to provide a service to a remote user, such as UE 1530 connecting via OTT connection 1550 terminating at UE 1530 and host computer 1510. In providing the service to the remote user, host application 1512 can provide user data which is transmitted using OTT connection 1550.

Communication system 1500 can also include base station 1520 provided in a telecommunication system and comprising hardware 1525 enabling it to communicate with host computer 1510 and with UE 1530. Hardware 1525 can include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 15) served by base station 1520. Communication interface 1526 can be configured to facilitate connection 1560 to host computer 1510. Connection 1560 can be direct or it can pass through a core network (not shown in FIG. 15) of the telecommunication system and/or through one or more intermediate networks outside the telecommunication system. In the embodiment shown, hardware 1525 of base station 1520 can also include processing circuitry 1528, which can comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 can also include UE 1530 already referred to. Its hardware 1535 can include radio interface 1537 configured to set up and maintain wireless connection 1570 with a base station serving a coverage area in which UE 1530 is currently located. Hardware 1535 of UE 1530 can also include processing circuitry 1538, which can comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 can be operable to provide a service to a human or non-human user via UE 1530, with the support of host computer 1510. In host computer 1510, an executing host application 1512 can communicate with the executing client application 1532 via OTT connection 1550 terminating at UE 1530 and host computer 1510. In providing the service to the user, client application 1532 can receive request data from host application 1512 and provide user data in response to the request data. OTT connection 1550 can transfer both the request data and the user data. Client application 1532 can interact with the user to generate the user data that it provides.

It is noted that host computer 1510, base station 1520 and UE 1530 illustrated in FIG. can be similar or identical to host computer 1430, one of base stations 1412a, 1412b, 1412c and one of UEs 1491, 1492 of FIG. 14, respectively. This is to say, the inner workings of these entities can be as shown in FIG. 15 and independently, the surrounding network topology can be that of FIG. 14.

Figure 15:
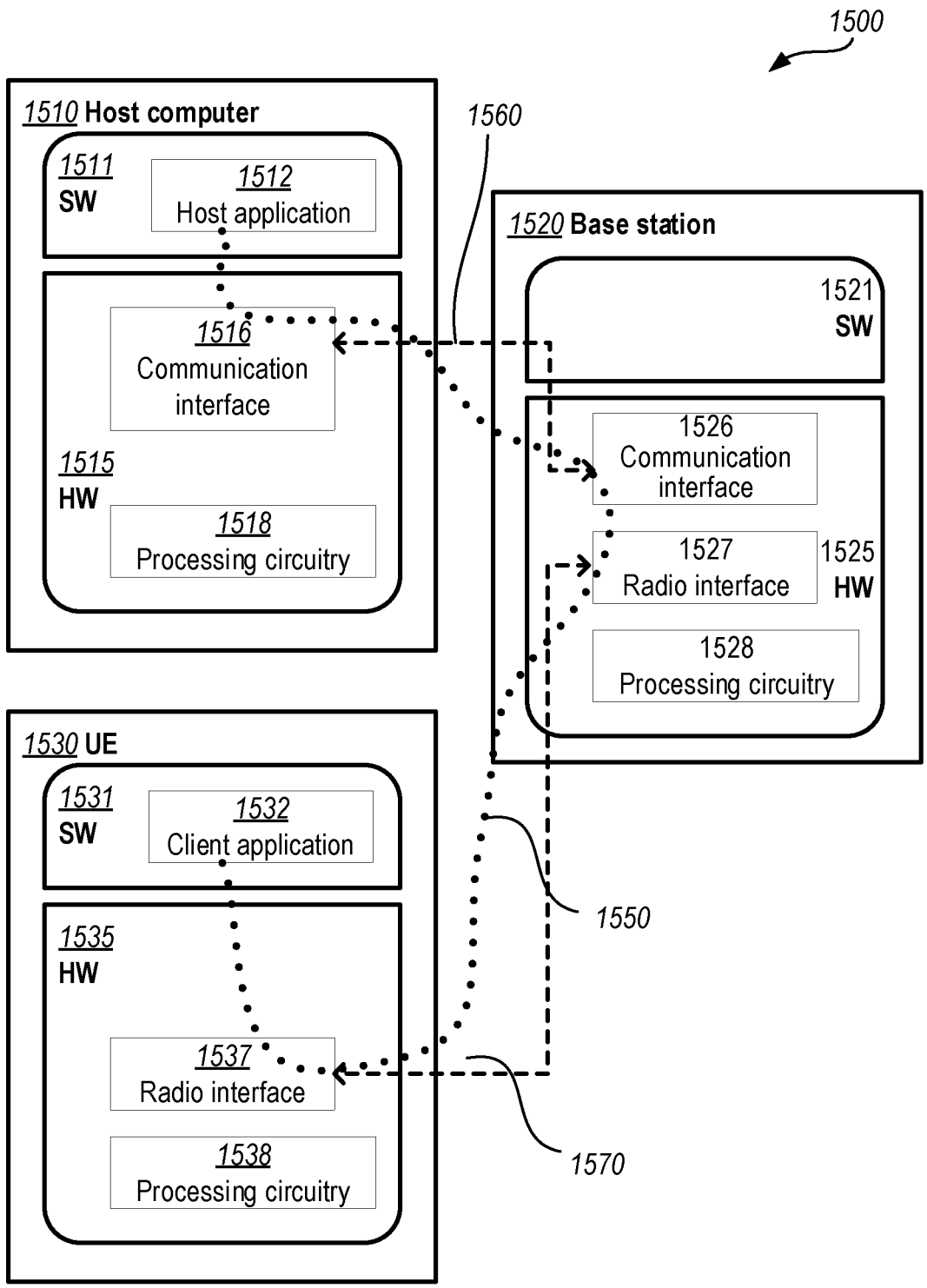

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure can determine the routing, which it can be configured to hide from UE 1530 or from the service provider operating host computer 1510, or both. While OTT connection 1550 is active, the network infrastructure can further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1550 between host computer 1510 and UE 1530, in response to variations in the measurement results. The measurement procedure and/or the network functionality for reconfiguring OTT connection 1550 can be implemented in software 1511 and hardware 1515 of host computer 1510 or in software 1531 and hardware 1535 of UE 1530, or both. In embodiments, sensors (not shown) can be deployed in or in association with communication devices through which OTT connection 1550 passes; the sensors can participate in the measurement procedure by supplying values of the monitored quantities exemplified above, or supplying values of other physical quantities from which software 1511, 1531 can compute or estimate the monitored quantities. The reconfiguring of OTT connection 1550 can include message format, retransmission settings, preferred routing etc.; the reconfiguring need not affect base station 1520, and it can be unknown or imperceptible to base station 1520. Such procedures and functionalities can be known and practiced in the art. In certain embodiments, measurements can involve proprietary UE signaling facilitating host computer 1510's measurements of throughput, propagation times, latency and the like. The measurements can be implemented in that software 1511 and 1531 causes messages to be transmitted, in particular empty or 'dummy' messages, using OTT connection 1550 while it monitors propagation times, errors etc.

FIG. 16 is a flowchart illustrating an exemplary method and/or procedure implemented in a communication system, in accordance with one embodiment. The communication system includes a host computer, a base station and a UE which, in some exemplary embodiments, can be those described with reference to FIGS. 14 and 15. For simplicity of the present disclosure, only drawing references to FIG. 16 will be included in this section. In step 1610, the host computer provides user data. In substep 1611 (which can be optional) of step 1610, the host computer provides the user data by executing a host application. In step 1620, the host computer initiates a transmission carrying the user data to the UE. In step 1630 (which can be optional), the base station transmits to the UE the user data which was carried in the transmission that the host computer initiated, in accordance with the teachings of the embodiments described throughout this disclosure. In step 1640 (which can also be optional), the UE executes a client application associated with the host application executed by the host computer.

FIG. 17 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission can pass via the base station, in accordance with the teachings of the embodiments described throughout this disclosure. In step 1730 (which can be optional), the UE receives the user data carried in the transmission.

FIG. 18 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 18 will be included in this section. In step 1810 (which can be optional), the UE receives input data provided by the host computer. Additionally or alternatively, in step 1820, the UE provides user data. In substep 1821 (which can be optional) of step 1820, the UE provides the user data by executing a client application. In substep 1811 (which can be optional) of step 1810, the UE executes a client application which provides the user data in reaction to the received input data provided by the host computer. In providing the user data, the executed client application can further consider user input received from the user. Regardless of the specific manner in which the user data was provided, the UE initiates, in substep 1830 (which can be optional), transmission of the user data to the host computer. In step 1840 of the method, the host computer receives the user data transmitted from the UE, in accordance with the teachings of the embodiments described throughout this disclosure.

FIG. 19 is a flowchart illustrating an exemplary method and/or procedure implemented in a communication system, in accordance with one embodiment. The communication system includes a host computer, a base station and a UE which can be those described with reference to FIGS. 14 and 15. For simplicity of the present disclosure, only drawing references to FIG. 19 will be included in this section. In step 1910 (which can be optional), in accordance with the teachings of the embodiments described throughout this disclosure, the base station receives user data from the UE. In step 1920 (which can be optional), the base station initiates transmission of the received user data to the host computer. In step 1930 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method for a first node, configured to provide a serving cell to a user equipment (UE) in a radio access network (RAN), to perform Automatic Neighbor Relations (ANR) with a second node configured to provide one or more neighbor cells of the serving cell, the method comprising:
   receiving, from the UE, a measurement report comprising a first cell identifier associated with a particular one of the neighbor cells;
   determining that the first cell identifier is not included in a neighbor relations table (NRT) maintained by the first node;
   sending, to the UE, a request to determine a global identity of the particular neighbor cell associated with the first cell identifier; and
   based on the content of a report from the UE in response to the request, determining one or more types of core networks, of a plurality of types, supported by the particular neighbor cell.

2. The method of embodiment 1, wherein the plurality of core network types comprises an Evolved Packet Core (EPC) and a 5G Core (5GC).

3. The method of any of embodiments 1-2, further comprising determining whether to perform ANR with the second node based on the determination of one or more types of core networks supported by the particular neighbor cell.

4. The method of any of embodiments 1-3, wherein determining whether to perform ANR with the second node is further based on the capabilities of the UE.

5. The method of any of embodiments 1-4, wherein:
   the report comprises a primary public land mobile network (PLMN) identifier associated with the particular neighbor cell; and
   determining one or more types of core network supported by the particular neighbor cell comprises, if the primary PLMN identifier does not match any of one or more further PLMN identifiers associated with a particular type of core network, determining that the particular neighbor does not support the particular type of core network.

6. The method of any of embodiments 1-4, wherein:
the report comprises a tracking area code (TAC) associated with the particular neighbor cell; and
determining one or more types of core network supported by the particular neighbor cell is based on the length of the TAC associated with the particular neighbor cell.

7. The method of any of embodiments 1-4, wherein determining one or more types of core network supported by the particular neighbor cell comprises:
determining whether information pertaining to a particular type of core network is present at an expected location in the report; and
if it is determined that such information is not present at the expected location, determining that the particular neighbor cell does not support the particular type of core network.

8. The method of any of embodiments 1-7, wherein determining one or more types of core network supported by the particular neighbor cell is further based on the capabilities of the UE.

9. A method performed a user equipment (UE) to support Automatic Neighbor Relations (ANR) between a first node and a second node in a radio access network (RAN), the first node being the UE's serving node, the method comprising:
sending, to the first node, a measurement report comprising a first cell identifier associated with a neighbor cell provided by the second node;
receiving, from the first node, a request to determine a global identity of the neighbor cell associated with the first cell identifier;
receiving, from the second node, broadcast system information pertaining to the neighbor cell;
determining, based on the received system information, one or more types of core network supported by the neighbor cell; and
sending, to the first node, a report indicating the one or more types of core network supported by the neighbor cell.

10. The method of embodiment 9, wherein the plurality of core network types comprises an Evolved Packet Core (EPC) and a 5G Core (5GC).

11. The method of any of embodiments 9-10, wherein determining the one or more types of core networks supported by the neighbor cell comprises determining whether or not the neighbor cell supports a particular type of core network based on one of the following:
the presence or absence, in the received system information, of access-related information pertaining to the particular type of core network; and
if present, the content of the access-related information pertaining to the particular type of core network.

12. The method of any of embodiments 9-10, wherein:
the received system information comprises a barring indicator pertaining to each of the plurality of core network types; and
determining the one or more types of core networks supported by the neighbor cell is based on the values of the respective barring indicators.

13. The method of any of embodiments 9-10, wherein:
determining the one or more types of core networks supported by the neighbor cell comprises determining the neighbor cell global identity information associated with a plurality of types of core networks supported by the neighbor cell; and
the report includes the global identity information associated with the plurality of types of core networks supported by the neighbor cell.

14. The method of embodiment 14, wherein for each type of core network supported by the neighbor cell, the global identity information sent in the report comprises tracking area code (TAC), cell identity, and primary public land mobile network (PLMN) identity.

15. The method of any of embodiments 9-10, wherein:
the received system information comprises a primary public land mobile network (PLMN) identity pertaining to at least one core network type; and
determining the one or more types of core networks supported by the neighbor cell comprises:
comparing each primary PLMN identity to one or more PLMN identifiers associated with a particular type of core network; and
if the primary PLMN identity does not match any of the PLMN identifiers, determining that the neighbor cell does not support the particular type of core network.

16. The method of embodiment 15, wherein if it is determined that the neighbor cell does not support the particular type of core network, sending the report without including information about support for the particular type of core network.

17. The method of embodiment 16, wherein if the received system information comprises the primary PLMN identity and one or more further PLMN identities associated with the particular type of core network, the report include the primary PLMN identity and the one or more further PLMN identities.

18. A first node configured to provide a serving cell to a user equipment (UE) in a radio access network (RAN) and to perform Automatic Neighbor Relations (ANR) with a second node configured to provide one or more neighbor cells of the serving cell, the network node comprising:
a communication interface; and
processing circuitry operably coupled to the communication interface and configured to perform any operations of any of embodiments 1-8; and
power supply circuitry configured to supply power to the network node.

19. A user equipment (UE) configured to support Automatic Neighbor Relations (ANR) between a first node and a second node in a radio access network (RAN), the first node being the UE's serving node, the UE comprising:
a communication interface; and
processing circuitry operably coupled to the communication interface and configured to perform any operations of any of embodiments 9-17; and
power supply circuitry configured to supply power to the UE.

20. A communication system including a host computer comprising:
processing circuitry configured to provide user data; and
a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-8.

21. The communication system of the previous embodiment further including the base station.

22. The communication system of the previous two embodiments, further including the UE, wherein the UE includes a radio interface and processing circuitry configured to communicate with the base station and cooperatively perform any of the operations comprising embodiments 9-17.

23. The communication system of the previous three embodiments, wherein:
the processing circuitry of the host computer is configured to execute a host application, thereby providing the user data; and
the UE's processing circuitry is further configured to execute a client application associated with the host application.

24. A method implemented in a communication system including a host computer, a base station, and a User Equipment (UE), the method comprising:
at the host computer, providing user data;
at the host computer, initiating a transmission carrying the user data to the UE via a cellular network comprising the base station; and
at the base station, performing operations corresponding to any of embodiments 1-8.

25. The method of the previous embodiment, further comprising, at the base station, transmitting the user data.

26. The method of the previous two embodiments, wherein the user data is provided at the host computer by executing a host application, the method further comprising, at the UE, executing a client application associated with the host application.

27. The method of the previous three embodiments, further comprising, at the UE, performing operations corresponding to any of embodiments 9-17.

28. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 1-8.

29. The communication system of the previous embodiment further including the base station.

30. The communication system of the previous two embodiments, further including the UE, wherein the UE includes a radio interface and processing circuitry configured to communicate with the base station and perform any of the operations comprising embodiments 9-17.

31. The communication system of the previous three embodiments, wherein:
the processing circuitry of the host computer is configured to execute a host application; and
the UE is further configured to execute a client application associated with the host application, thereby providing the user data to be received by the host computer.

The invention claimed is:

1. A method for a first node, configured to provide a serving cell to a user equipment (UE) in a radio access network (RAN), to determine core network types supported by a second node configured to provide one or more neighbor cells of the serving cell, the method comprising:
determining that a first cell identifier associated with a particular one of the neighbor cells is not included in a neighbor relations table (NRT) maintained by the first node;
sending, to the UE, a request to report a second cell identifier associated with the particular neighbor cell, wherein the request includes the first cell identifier; and
based on the content of a report from the UE, determining one or more core network types supported by the particular neighbor cell, wherein:

the one or more types of core networks include a first core network type, which is one of an Evolved Packet Core (EPC) and a 5G Core (5GC),
the report indicates that the particular neighbor cell supports the first core network type,
the report also includes cell-access-related information, for the particular neighbor cell, with respect to the first core network type, and
the cell-access-related information includes the following: a tracking area code (TAC), the first cell identifier, and information identifying one or more public land mobile networks (PLMNs).

2. The method of claim 1, wherein:
the one or more types of core networks are determined from a plurality of core network types including the first core network type and a second core network type; and
the second core network type is the other of the EPC and the 5GC.

3. The method of claim 1, wherein the information identifying one or more PLMNs comprises one of the following:
a list of one or more PLMN identities, or
a list of one or more PLMN indices, each PLMN index corresponding to a position in a list of PLMN identities.

4. The method of claim 1, wherein:
the particular neighbor cell is associated with a plurality of public land mobile networks (PLMNs); and
the report includes the cell-access-related information for the plurality of PLMNs with respect to the first core network type.

5. The method of claim 1, wherein:
the second cell identifier is a cell global identifier (CGI), and
the report does not include the CGI of the particular neighbor cell with respect to the first core network type.

6. A method performed a user equipment (UE), the method comprising:
receiving, from a first node configured to provide the UE's serving cell in a radio access network (RAN), a request to report a second cell identifier associated with a particular neighbor cell provided by a second node in the RAN, wherein the request includes a first cell identifier associated with the particular neighbor cell;
receiving system information broadcast in the particular neighbor cell, wherein the received system information includes cell-access-related information for the particular neighbor cell with respect to a first core network type, which is one of an Evolved Packet Core (EPC) and a 5G Core (5GC);
based on the received system information, determining one or more core network types supported by the particular neighbor cell; and
sending, to the first node, a report indicating the one or more core network types supported by the particular neighbor cell, wherein:
the report indicates that the particular neighbor cell supports the first core network type,
the report includes the cell-access-related information with respect to the first core network type, and
the cell-access-related information includes the following: a tracking area code (TAC), the first cell identifier, and information identifying one or more public land mobile networks (PLMNs).

7. The method of claim 6, wherein:
the one or more types of core networks are determined from a plurality of core network types including the first core network type and a second core network type; and
the second core network type is the other of the EPC and the 5GC.

8. The method of claim 6, wherein the information identifying one or more PLMNs comprises one of the following:
a list of one or more PLMN identities, or
a list of one or more PLMN indices, each PLMN index corresponding to a position in a list of PLMN identities.

9. The method of claim 6, wherein:
the particular neighbor cell is associated with a plurality of public land mobile networks (PLMNs);
the received system information includes cell-access-related information for the plurality of PLMNs with respect to the first core network type; and
the report includes the cell-access-related information for the plurality of PLMNs with respect to the first core network type.

10. The method of claim 6, wherein:
the second cell identifier is a cell global identifier (CGI), and
the report does not include the CGI of the particular neighbor cell with respect to the first core network type.

11. A first node configured to provide a serving cell to a user equipment (UE) in a radio access network (RAN) and to determine core network types supported by a second node configured to provide one or more neighbor cells of the serving cell, the first node comprising:
interface circuitry operable to communicate with the UE; and
processing circuitry operably coupled to the interface circuitry, whereby the processing circuitry and the interface circuitry are configured to:
determine that a first cell identifier associated with a particular one of the neighbor cells is not included in a neighbor relations table (NRT) maintained by the first node;
send, to the UE, a request to report a second cell identifier associated with the particular neighbor cell, wherein the request includes the first cell identifier; and
based on the content of a report from the UE, determine one or more core network types supported by the particular neighbor cell, wherein:
the one or more types of core networks include a first core network type, which is one of an Evolved Packet Core (EPC) and a 5G Core (5GC),
the report indicates that the particular neighbor cell supports the first core network type,
the report also includes cell-access-related information, for the particular neighbor cell, with respect to the first core network type, and
the cell-access-related information includes the following: a tracking area code (TAC), the first cell identifier, and information identifying one or more public land mobile networks (PLMNs).

12. The first node of claim 11, wherein:
the one or more types of core networks are determined from a plurality of core network types including the first core network type and a second core network type; and
the second core network type is the other of the EPC and the 5GC.

13. The first node of claim 11, wherein the information identifying one or more PLMNs comprises one of the following:
a list of one or more PLMN identities, or
a list of one or more PLMN indices, each PLMN index corresponding to a position in a list of PLMN identities.

14. The first node of claim 11, wherein:
the particular neighbor cell is associated with a plurality of public land mobile networks (PLMNs); and
the report includes the cell-access-related information for the plurality of PLMNs with respect to the first core network type.

15. The first node of claim 11, wherein:
the second cell identifier is a cell global identifier (CGI), and
the report does not include the CGI of the particular neighbor cell with respect to the first core network type.

16. A user equipment (UE) comprising:
radio interface circuitry configured to communicate with first and second nodes in a radio access network (RAN), where the first node is configured to provide the UE's serving cell in the RAN; and
processing circuitry operably coupled to the radio interface circuitry, whereby the processing circuitry and the radio interface circuitry are configured to:
receive, from the first node, a request to report a second cell identifier associated with a particular neighbor cell provided by the second node, wherein the request includes a first cell identifier associated with the particular neighbor cell;
receive system information broadcast in the particular neighbor cell, wherein the received system information includes cell-access-related information for the particular neighbor cell with respect to a first core network type, which is one of an Evolved Packet Core (EPC) and a 5G Core (5GC);
based on the received system information, determine one or more core network types supported by the particular neighbor cell; and
send, to the first node, a report indicating the one or more core network types supported by the particular neighbor cell, wherein:
the report indicates that the particular neighbor cell supports the first core network type,
the report includes the cell-access-related information with respect to the first core network type, and
the cell-access-related information includes the following: a tracking area code (TAC), the first cell identifier, and information identifying one or more public land mobile networks (PLMNs).

17. The UE of claim 16, wherein:
the one or more types of core networks are determined from a plurality of core network types including the first core network type and a second core network type; and
the second core network type is the other of the EPC and the 5GC.

18. The UE of claim 16, wherein the information identifying one or more PLMNs comprises one of the following:
a list of one or more PLMN identities, or
a list of one or more PLMN indices, each PLMN index corresponding to a position in a list of PLMN identities.

19. The UE of claim 16, wherein:
the particular neighbor cell is associated with a plurality of public land mobile networks (PLMNs);

the received system information includes cell-access-related information for the plurality of PLMNs with respect to the first core network type; and the report includes the cell-access-related information for the plurality of PLMNs with respect to the first core network type.

20. The UE of claim 16, wherein:

the second cell identifier is a cell global identifier (CGI), and the report does not include the CGI of the particular neighbor cell with respect to the first core network type.

* * * * *